US011071057B2

(12) United States Patent
Eleftheriadis et al.

(10) Patent No.: US 11,071,057 B2
(45) Date of Patent: Jul. 20, 2021

(54) ENERGY CONTROL DEVICES AND METHODS FOR ENERGY MANAGEMENT IN A TRANSMISSION SITE OF A WIRELESS COMMUNICATION NETWORK

(71) Applicant: Telefonaktiebolaget LM Ericsson (publ), Stockholm (SE)

(72) Inventors: Lackis Eleftheriadis, Gävle (SE); Per Eklund, Lidingö (SE); Ulf Neüman, Sollentuna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 75 days.

(21) Appl. No.: 16/321,861

(22) PCT Filed: Aug. 5, 2016

(86) PCT No.: PCT/SE2016/050742
§ 371 (c)(1),
(2) Date: Jan. 30, 2019

(87) PCT Pub. No.: WO2018/026319
PCT Pub. Date: Feb. 8, 2018

(65) Prior Publication Data
US 2019/0182766 A1    Jun. 13, 2019

(51) Int. Cl.
*H04W 52/02*     (2009.01)
(52) U.S. Cl.
CPC ......... *H04W 52/0206* (2013.01); *Y02D 30/70* (2020.08)
(58) Field of Classification Search
None
See application file for complete search history.

(56) References Cited

U.S. PATENT DOCUMENTS 9,781,685 B2 * 10/2017 Tsui .................. H04W 24/02
2007/0263563 A1 * 11/2007 Biagioni ............. H04W 76/40
370/328

(Continued)

FOREIGN PATENT DOCUMENTS

CN    103477695 A    12/2013
CN    204347128 U  *  5/2015

(Continued)

OTHER PUBLICATIONS

International Search Report and Written Opinion of the International Searching Authority for International Application No. PCT/SE2016/050742 dated Apr. 11, 2017.

(Continued)

*Primary Examiner* — Mohammed Rachedine
(74) *Attorney, Agent, or Firm* — Sage Patent Group

(57) ABSTRACT

According to one aspect, a method and an energy control device are provided for estimating electricity consumption during one or more transmission intervals of a transmission site or part of a transmission site. Said site comprises a scheduler for scheduling assignments, and a set of radio transmitters having known radio efficiency $\eta_r$. Said method comprises a step of estimating scheduled transmission electricity consumption $E_{TOT}$ based on a quotient of a sum $P_{sch,sum}$ of scheduled radio transmission powers $P_{sch}$ and the radio efficiency $\eta_r$. An energy management control method based on information from the scheduler to control the alternative energy sources on site is provided, wherein said information is depending on radio traffic load. The energy control method for every TTI for efficient and effective control that is based on the real traffic situation.

16 Claims, 14 Drawing Sheets

(56) References Cited

U.S. PATENT DOCUMENTS

| | | | | |
|---|---|---|---|---|
| 2012/0252525 A1* | 10/2012 | Frenger | ............ | H04W 52/0206 |
| | | | | 455/524 |
| 2012/0289224 A1 | 11/2012 | Hallberg et al. | | |
| 2012/0329471 A1* | 12/2012 | Barta | ................ | H04W 52/0206 |
| | | | | 455/452.1 |
| 2014/0140238 A1* | 5/2014 | Liu | ................... | H04W 52/0206 |
| | | | | 370/252 |
| 2015/0282070 A1* | 10/2015 | Salem | ............... | H04W 52/0206 |
| | | | | 370/311 |

FOREIGN PATENT DOCUMENTS

| | | | | |
|---|---|---|---|---|
| CN | 105228175 A * | 1/2016 | | |
| KR | 101606723 B1 | 4/2016 | | |
| WO | WO-2016024804 A2 * | 2/2016 | ............. | G06Q 50/06 |
| WO | WO-2018088816 A1 * | 5/2018 | ........... | H04L 5/0048 |

OTHER PUBLICATIONS

Examination Report dated Mar. 28, 2021 for Indian Patent Application No. 201947004086, 6 pages.

\* cited by examiner

| Energy Source | Available Power (W) | Efficiency (%) | 1) Power Need (W) | 2) Power need (W) | Energy Head-Room (Wh) | Start time of Energy Source (s) | 3) Power need (W) | Time Remaining (h) | Wind Speed (m/s) | Irradiation (W/m²) | Frequency Variation | Cost/kWh |
|---|---|---|---|---|---|---|---|---|---|---|---|---|
| Total Power Need | NA | NA | NA | Value | NA | NA | NA | NA | NA | NA | NA | NA |
| Wind | Value | Value | Value | NA | Value | NA | Value | Value (if available) | Value | NA | Value | Value |
| Sun | Value | Value | Value | NA | Value | NA | Value | Value (if available) | NA | Value | Value | Value |
| Grid | Value | Value | Value | NA | Value | NA | Value | Good/Bad | NA | NA | Value | Value |
| FC | Value | Value | Value | NA | NA | Value | Value | Value | NA | NA | Value | Value |
| DG | Value | Value | Value | NA | NA | Value | Value | Value | NA | NA | Value | Value |
| Battery | Value | Value | Value | NA | Value | NA | Value | Value | NA | NA | Value | Value |

Fig. 12

ENERGY CONTROL DEVICES AND METHODS FOR ENERGY MANAGEMENT IN A TRANSMISSION SITE OF A WIRELESS COMMUNICATION NETWORK

CROSS REFERENCE TO RELATED APPLICATION

This application is a 35 U.S.C. § 371 national stage application of PCT International Application No. PCT/SE2016/050742, filed on Aug. 5, 2016, the disclosure and content of which is incorporated by reference herein in its entirety.

TECHNICAL FIELD

The presented technology relates to energy control devices and methods for energy management in a transmission site of a wireless communication network

BACKGROUND

FIG. 1 is a block diagram schematically illustrating a wireless telecommunications system power fed by an external power grid according to prior art.

The wireless telecommunications system comprises a network comprising transmissions sites, such as Radio Base Stations, RBSs, sites 20. Herein a site is controlled by a physical RBS serving macro and/or small cells (herein areas limited by dashed lines). A cell is an area in which an RBS is capable of supporting wireless radio communication, i.e. radio traffic, with a Mobile Terminal, MT 25. Each RBS site 20, 20A, 20B is electrically powered from an external power feed, e.g. an AC (Alternating Current) power grid or other energy source. As illustrated, each RBS 30 is connected to an external power feed 10.

In the example in FIG. 1, RBS 30 in site 20 is connected to the external power feed 10A:1 via a power input connection 12 which may be an electric power cable. Other RBSs in nearby sites 20A, 20B are connected in the same way via an electric power cable 12 to the same power feed or another power feed 10A:2 operated by another power supplier than the first RBS site 20. However, power feeds indicated as 10A:1 and 10A:2 may be the same power grid.

The AC grid transmission lines are located around the country. The RBS nodes are located in different areas/cities, and are powered via (transformer) substations via the power transmission lines.

A radio or transmission site node comprises a RBS 30 with at least one antenna and transceiver unit 62 providing wireless access for MTs 25 to the node within the site 20B by means of any standardized Radio Access Technology, RAT, e.g. GSM (Global System for Mobile telecommunication), 3G (Third Generation), 4G (Forth Generation), LTE (Long Term Evolution), enhanced LTE, LTE advanced, 5G etc.

In FIG. 1, three RBS sites 20, 20A, 20B are illustrated. RBS sites indicated 20 and 20A are macro sites. RBS site indicated 20B is managing and controlling a small, or micro, cell structure only. RBS sites 20, 20A are therefore denoted RBS macro cell sites, and RBS site 20B is denoted RBS micro cell site. The micro/small cell site 20B comprises an RBS 30B. A micro or small cell may cover a smaller part of a macro cell in a RBS macro cell site. The RBSs 30, 30B are capable of signalling and exchanging information messages via standardized protocols, e.g. at handover procedures. If an MT 25 moves from one cell or site to another cell or site, the RBSs of said cells exchange information to initiate and finalize such a handover procedure. The communication paths 22 between the RBSs are indicated by dash-dot arrows for indicating bi-directional communication.

A wireless access network comprises often a plurality of RBSs. An RBS or RBS site may be owned by one party, e.g. a tower owner, and the equipment therein leased to at least one tenant, such as operator company. The tenants offer wireless radio access for different users and their wireless devices.

From the users', tenants' and an operator's view, it is important that the charging is correctly performed. Today, the energy consumption of a RBS is measured by means of hardware equipment, such as Energy Measurement Units, EMUs (e.g. electricity meters). It is therefore necessary to perform measurement at the electric energy input of the RBS and to split the cost according to some kind of business model. An RBS may therefore comprise at least one EMU for each tenant. An operator must therefore organize and arrange the EMUs in the RBS to be able to measure each tenant's energy consumption in a way enabling fair charging for each tenant's energy consumption. The business model may be further complicated if an RBS is supplied from different electric energy sources beside the grid, such as Wind, Solar Cells, electric generators driven by any fuel, such as gas, diesel, etc.

SUMMARY

According to one aspect, it is provided a method, and embodiments thereof for estimating electricity consumption $E_{TOT}$ during one or more transmission intervals of a transmission site or part of a transmission site. The site comprises an associated scheduler for scheduling assignments during said one or more transmission intervals, and a set of radio transmitters having radio efficiency $\eta_r$. Said method comprising a step of estimating scheduled transmission electricity consumption $E_{tr,TOT}$ based on a quotient of a sum $P_{sch,sum}$ of scheduled radio transmission powers $P_{sch}$ and the radio efficiency $\eta_r$.

According to further one aspect, it is provided an energy control device for estimating electricity consumption $E_{TOT}$ during one or more transmission interval of a transmission site or part of a transmission site. The site comprises an associated scheduler for scheduling assignments and a set of radio transmitters having radio efficiency $\eta_r$. The device comprises a processor in a processing circuitry being operative to estimate scheduled transmission electricity consumption $E_{tr,TOT}$ based on a quotient of a sum $P_{sch,sum}$ of scheduled radio transmission powers $P_{sch}$ and the radio efficiency $\eta_r$.

The above presented method and energy control device has a number of advantages, such as:
1) Enhanced software (SW) based energy meter depending on Downlink/Uplink traffic for different tenants via scheduler;
2) The method can be used on current installed base, with no hardware (HW) changes;
3) Increase reliability of the system by using SW based energy meter instead of using external HW energy meter;
4) The method can easily be applied for adding or removing tenants by SW, operating system;
5) A feature for infrastructure sharing used as for operators and tower companies.

BRIEF DESCRIPTION OF THE DRAWINGS

The foregoing, and other, objects, features and advantages of the herein provided technique will be more readily understood upon reading the following detailed description in conjunction with the drawings in which:

FIG. 12 is an example of an energy source table;

DETAILED DESCRIPTION

In the following description, for purposes of explanation and not limitation, specific details are set forth, such as particular circuits, circuit components, techniques, etc. in order to provide a thorough understanding of the herein provided technology. However, it will be apparent to one skilled in the art that the herein provided technology may be practiced in other embodiments that depart from these specific details. In other instances, detailed descriptions of well-known methods, devices, and circuits are omitted so as not to obscure the description of the herein provided technology with unnecessary detail.

According to a basic aspect, electricity consumption for radio transmission in a radio base station site is estimated based on scheduler data. Past consumption as well as scheduled future consumption may be estimated.

Figure 2:
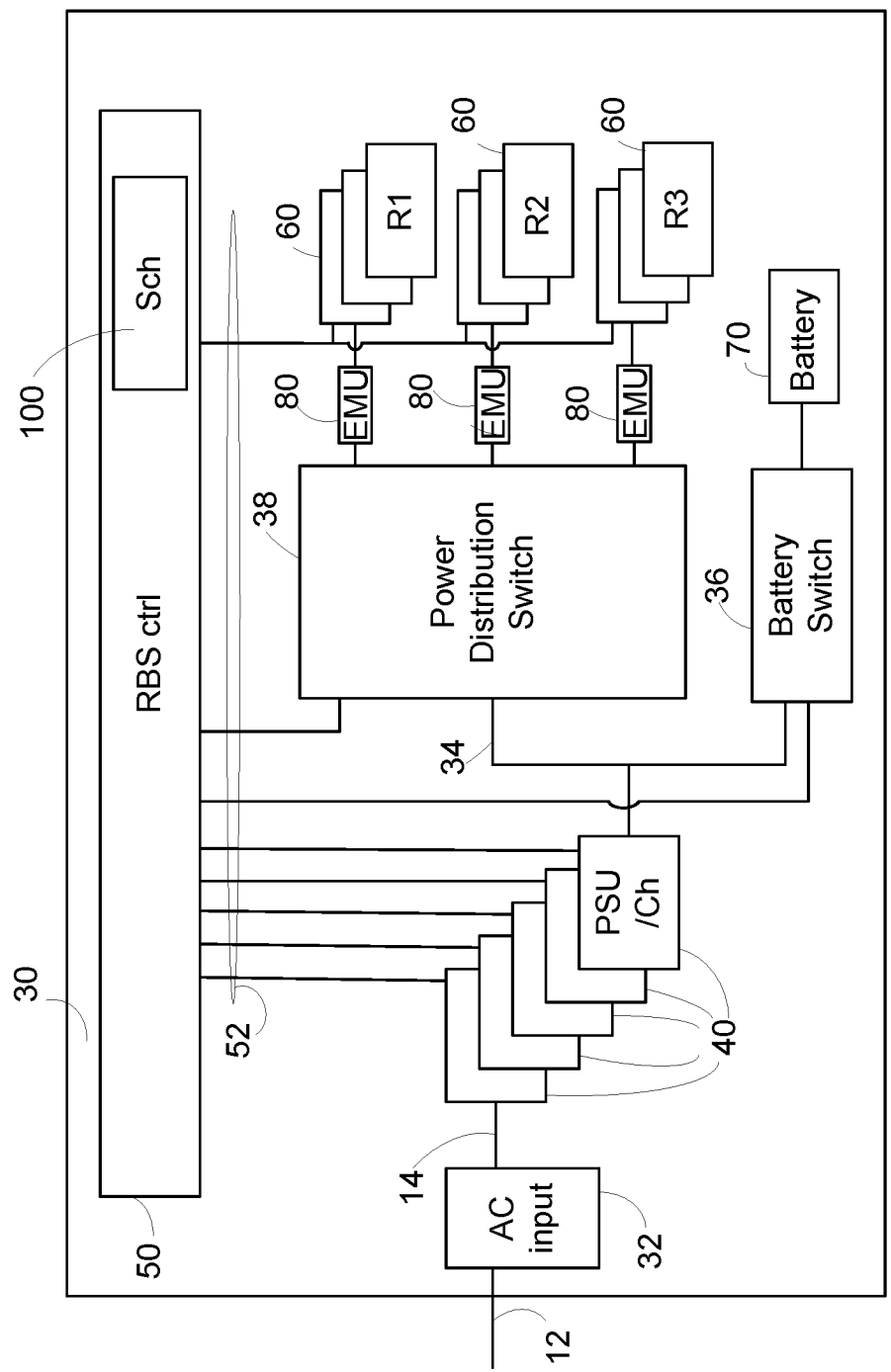
FIG. 2 is a block diagram illustrating an example of a transmission site power management system architecture.

FIG. 2 is a block diagram illustrating an example of a transmission site power management system architecture.

The transmission site, such as RBS, comprises either an eNodeB of a Long Term Evolution (LTE) system, Radio Network Controller (RNC) of a Third Generation (3G) system, Base Station Controller (BSC) of a Global System for Mobile Communication (GSM or 2G) or a Baseband Unit of a Fifth Generation (5G) system or possibly a combination of one or more of these.

Figure 1:
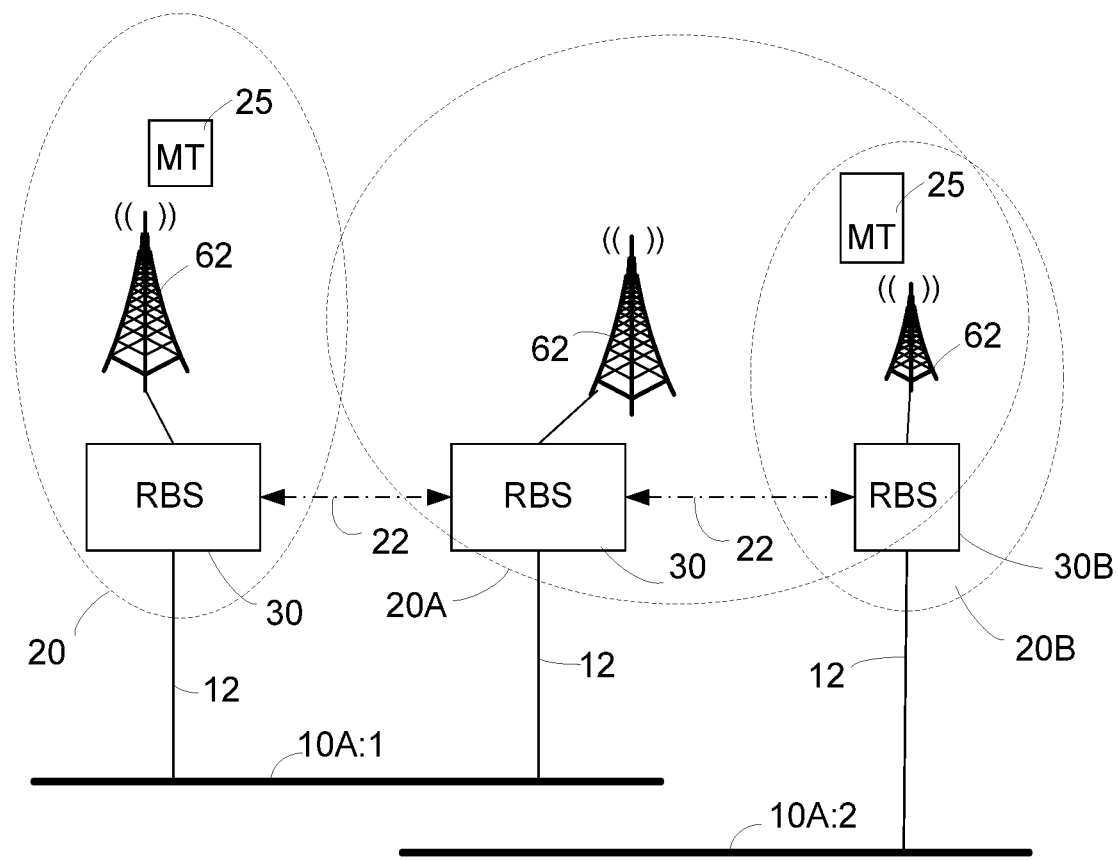
FIG. 1 is a block diagram schematically illustrating a wireless telecommunications system according to prior art.

The operation and functions of a transmission site, or RBS, 30 is handled and controlled by a RBS controller 50, which comprises at least one processor circuitry of digital processors and supporting memory storages for storing computer software and processing data. When said computer software is executed by the digital processors, different functions of a RBS are implemented, such as e.g. handover of mobile terminals between different RBS sites, communication with the mobile stations and a backbone of the RBS enabling communication with different nodes in the Internet, control of different functional blocks or units in the RBS, etc. Some functions may be implemented as hardware. For said purposes, the RBS comprises a number of digital buses 52 connected to the functions blocks and units. In the example of FIG. 2, said function blocks and units consume electric power and could therefore be considered as loads 60. Examples of said loads are radio stages R1, R2, R3, comprising transceivers (transmitters/receivers), power amplifier circuits and antennas (60 in FIG. 1).

The power feeding of said function blocks or units are provided by a power management system comprising a power distribution system. Said power distribution system comprises one or a plurality of power feed circuits or power supply units (PSUs) also sometimes denoted as chargers 40. Thus, a PSU 40 may be designated for one or more function blocks and units. The PSUs 40 are connected to the external power feed, most probably an AC grid, via a power cable connection 12 via an AC input interface 32, which may distribute different phases provided by the AC grid through connections to the input terminals 14 of the PSUs. The electricity supplied $E_{tot,in}$ may be measured at one or more power supply inputs and provided to the controller.

The PSUs convert the AC power into DC which is distributed to the loads 60 via wiring 34 to power distribution switches 38 enabling to switch off and on the power to different loads 60, i.e. functional blocks and units. Any disturbance in the external power feeding on connection 12 will propagate through the AC input interface 32 to the input terminals 14 of the PSUs 40. The power management system is controlled by the RBS controller for controlling the power distribution system.

For securing power feeding to the RBS in case of external power failure, the RBS is provided with an internal power feed 70, e.g. an arrangement of batteries capacity adapted to provide enough power capacity to the RBS during a pre-set time of external power feed failure. A switch 36 is provided for connecting and disconnecting the power feeding from the internal power 70.

As illustrated in FIG. 2, the control buses 52 are connected between the RBS controller 50 and the functional blocks and units 40, 36, 38, 60 enabling control by the RBS controller and two way communications with said functional blocks and units.

A radio stage may be dedicated to serve only one of the tenants, e.g. R1 is reserved for a tenant T1, while R2 is dedicated to tenant T2, etc. According to prior art, it is possible to measure a tenant's electric energy consumption depending on the traffic load by connecting an EMU 80 to the output of the power distribution switch supplying electric power to the Radio Stage R1. Thus, the EMU is located in between the output of the power distribution switch and the corresponding Radio Stage serving a tenant.

According to another implementation, a stage may be adapted to operate according to a special Radio Access Technology, RAT. More than one tenant may be served by each stage.

Today's power system can measure energy via an EMU 80 connected to the transmission site (RBS/BTS), so called Energy meter. This energy meter is a bulky HW that needs to be mounted to every external power output from the Power Distribution Unit (PDU), to measure the specific power or measure bulk power for the specific tenant/operator on new or already installed base. The energy meter needs to be mounted in the cabinet system by a physical person on site. This requires extra site visit for installation. The Energy measure is used to differentiate the energy for the respective tenants/operator for correct billing of energy in use.

The current solution with EMU requires separate HW to be installed on the telecom site or RBS, to measure energy for every tenants/operator. To measure energy consumption the solution need to be installed and be mounted in the cabinet or on site, and that requires a site visit and installation time. In some cases the already installed cabinets have no place for the extra HW, Energy meter that is installed for the bulky HW and need more installation time compared that with the new SW feature. The extra hardware may affect the system MTBF (mean time between failures) negatively.

In the following, an alternative solution for measuring energy will be presented.

Determining energy consumption from scheduler data, for cost assignment and for advance control of energy systems, Instead of using hardware measurement devices, data from the radio scheduler can be used to provide a good estimate of electricity consumption if appropriately processed. The scheduler schedules assignments, e.g. data packets to be transmitted, and it determines the power to be radiated.

A scheduling assignment is an allocation of particular downlink transmission resources to a user, e.g. a particular channel or particular OFDM subcarriers for a certain time.

An example of a scheduling assignment is in the 3GPP 4G/LTE (Third generation Partnership Program fourth generation/Long Term Evolution) standard the allocation to a user of a particular resource in the PDSCH (Physical Downlink Shared Channel) resulting in the transmission of data to that user in the OFDM symbols and OFDM subcarriers making up the resource. The resource may be for example an LTE resource block of 12 subcarriers during 0.5 milliseconds.

A decision on a scheduling assignment for a user typically also includes or implies a transmit power to use for that assignment. Hence, from scheduler data, the transmit power for a scheduling assignment can be determined.

In LTE, the information of an Energy per Resource Element value may be used; this value denotes the energy of an LTE resource element (one subcarrier during one OFDM symbol) as an average over all constellation points of the modulation scheme and before cyclic prefix insertion. This value may be summed for the resource elements comprised in the scheduling assignment. Optionally and for better accuracy, it may be adjusted (increased) to also account for the energy of the cyclic prefix.

By knowledge of the radio efficiency (which may be assumed to be constant, or for better accuracy be determined as a function of the total scheduled power), can be used to determine the electricity consumption of the radio transmission, e.g. by dividing scheduled transmit power with the radio efficiency. By knowledge of the transmit power scheduled for each tenant, radio electricity consumption per tenant may be determined. Other electricity consumption in the site may also be assigned to tenants based on scheduled radiated power, for example in proportion to scheduled radiated power.

From knowledge of the radio efficiency, excess heat produced by the radio may also be determined: Based on knowledge of cooling system efficiency (e.g used electric energy for the cooling equipment per heat energy removed from the enclosure) it is possible to assign also electricity consumption for cooling to tenants.

Alternatively, electricity consumption for cooling may be determined based on operations data for the cooling system (e.g. duty cycle data such as on-time for fans) and then assigned to tenants in proportion to each tenants scheduled power or each tenants share of heat loss in radios or other equipment.

Further, energy losses in PSUs may be determined from knowledge of PSU efficiency (e.g. assumed constant or varying in a known way with load) and assigned to tenants.

Further, since scheduling is known some time in advance, by determining electricity consumption from scheduler data it will be possible to control the available energy sources continuously (for example to switch on or off PSUs to save on idling power consumption) to match the load without unnecessary excess capacity and thus improve energy efficiency.

Figure 3:
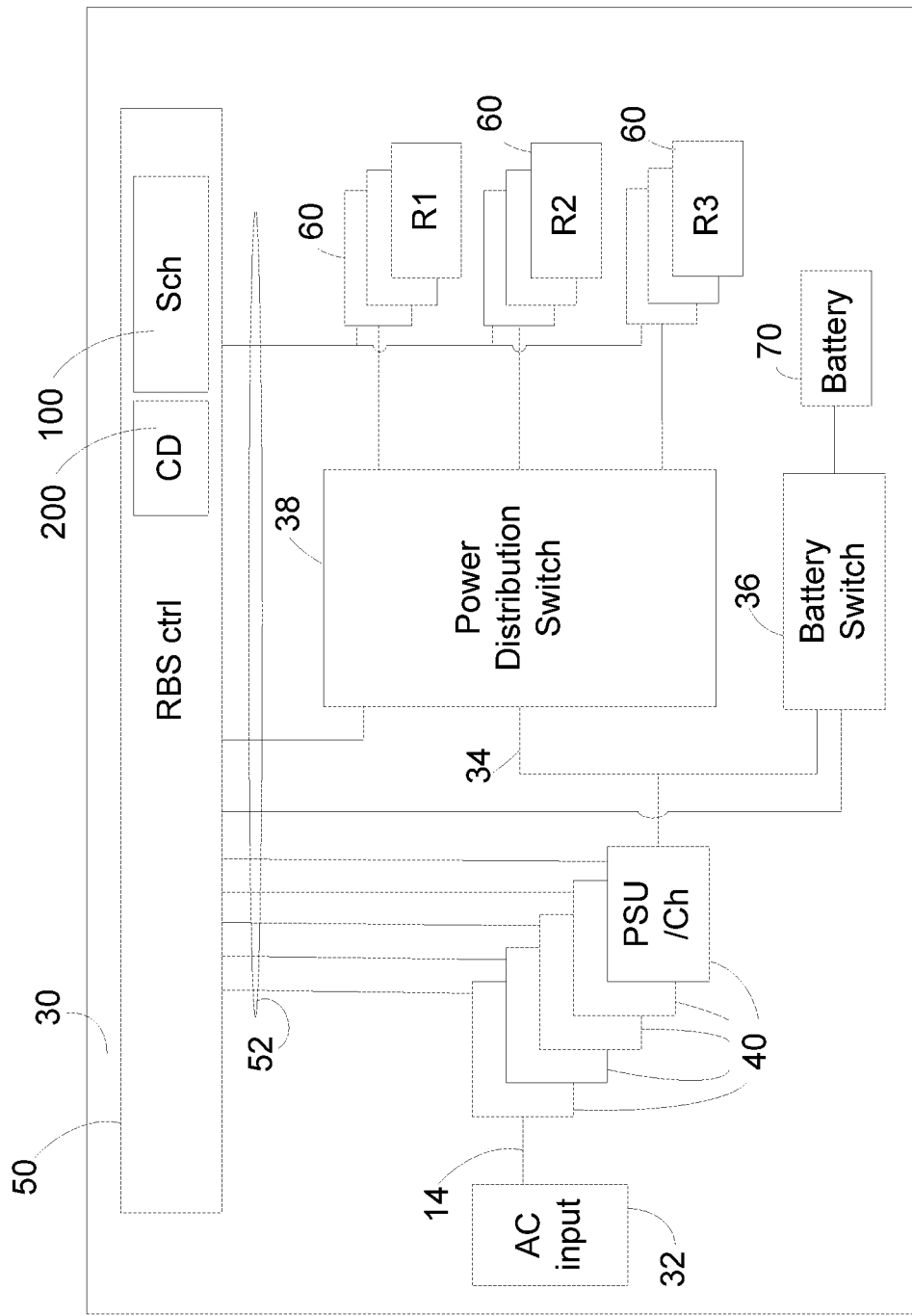
FIG. 3 is a block diagram illustrating an alternative solution of a transmission site power management system.

FIG. 3 is illustrating an alternative solution of a transmission site power management system. The architecture of the systems illustrated in FIGS. 2 and 3 are similar except that the EMUs 80 in the system in FIG. 2 are replaced by an energy control device CD 200 being a part of or associated with the RBS controller 50. The power management system comprises said energy control device CD 200 and the power distribution system.

The energy control device, the scheduler and other functionality of the site may be implemented by on-site hardware, but also wholly or partly as a cloud solution where functionality is executed in a cloud computing center. The basic principles of the invention remain the same regardless of where functionality is executed.

The solution is based on the associated scheduler 100, which is comprised in or associated (e.g. in a cloud architecture solution) with the transmission site or a part of the transmission site (20 in FIG. 1) and controls the data traffic transmission operation of the radio transmitters of a transmission site. The scheduler plans the radio traffic to be sent for a coming time interval based on radio traffic information. By letting an energy control device or unit be in connection with the scheduler, said energy control device or unit calculates the needed power consumption condition for the coming time interval, it will be possible to measure the power consumption. The new method for energy meter does not require any HW to be installed. The new solution solves the problem that is raised in current installed cabinets, and does not require site visit. The method can be remotely downloaded to the transmission site.

It is therefore suggested an energy control device or unit and method S100 for estimating electricity consumption $E_{TOT}$.

The method for estimating electricity consumption $E_{TOT}$ is based on the sum of the scheduled radio transmission power $P_{sch,sum}$ during a transmission interval and radio efficiency $\eta_r$ of at least one radio transmitter of the transmission site. Regarding the radio efficiency $\eta_r$, a known and fixed value of the radio efficiency may be used, e.g. an average value $\eta_{r,avg}$ based on the radio efficiency $\eta_r$ of a number of radio transmitters of the transmission site. Alternatively, a measured value of the radio efficiency $\eta_r$ may be used.

Further one alternative is the use of a radio transmission efficiency $\eta_r$ which is dependent of the total scheduled radio transmission power $P_{sch,sum}$, i.e. $\eta_r[P_{sch,sum}]$, which will result in an improved accuracy of the estimation of electricity consumption $E_{TOT}$. Based on the dependency between the radio transmission efficiency $\eta_r$ and the total scheduled radio transmission power $P_{sch,sum}$, it is possible to find a relation between electricity consumption $E_{TOT}$ and radio transmission power $P_{sch,sum}$. Said relation may be implied and expressed in a table, from which a value of the electricity consumption $E_{TOT}$ may be acquired for a value of the radio transmission power $P_{sch,sum}$.

If the radio transmission efficiency $\eta_r$ is variating over time due to variation of the radio transmission power $P_{sch,sum}$, a fixed value of the radio efficiency $\eta_r$ may be used during a transmission interval with time length TI, wherein the radio transmission power $P_{sch,sum}$ is not variating. E.g. for each interval of constant $\eta_r$, the relevant $\eta_r$ is determined based on $P_{sch,sum}$ and electricity consumption is then determined based on scheduled power and $\eta_r$.

The relationship between $P_{sch,sum}$ and $\eta_r$ may be e.g. pre-measured and stored, or calculated according to a pre-determined mathematical relationship.

Figure 4:
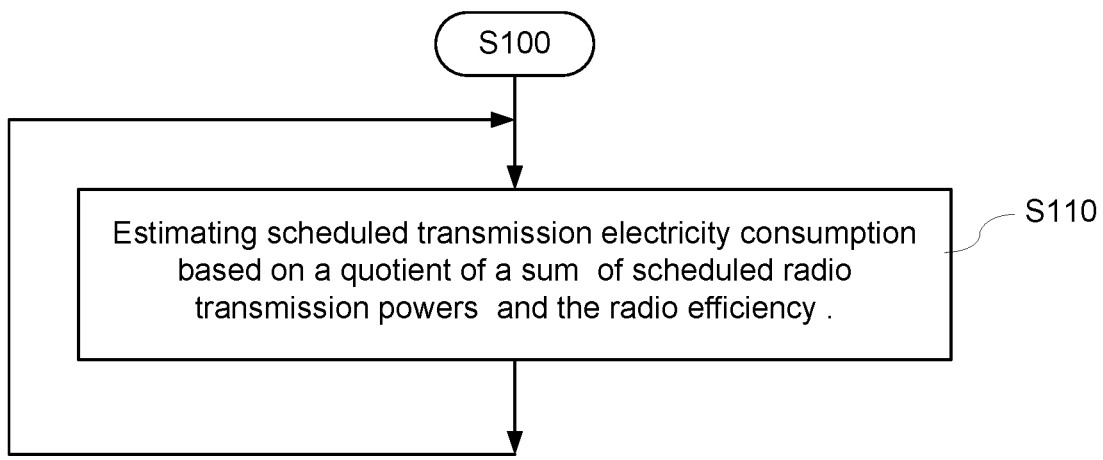
FIG. 4 is flowchart of a method S100 for estimating electricity consumption $E_{TOT}$.

FIG. 4 is flowchart of a method S100 for estimating electricity consumption $E_{TOT}$.

In FIG. 4 it is illustrated a method for estimating the electricity consumption $E_{TOT}$ during a transmission interval of a transmission site or part of a transmission site. The site comprises a scheduler for scheduling assignments using said transmission site, a set of radio transmitters having radio efficiency $\eta_r$. Said method comprising a step of:

S110:—Estimating scheduled transmission electricity consumption $E_{tr,TOT}$ based on a quotient of a sum $P_{sch,sum}$ of scheduled radio transmission powers $P_{sch}$ and the radio efficiency r.

The scheduled power $P_{sch}$ during transmission interval TI may be acquired from an energy per Resource Element value provided by the scheduler.

Following equation may therefore be used:

$$E_{tr,TOT} = P_{sch,sum} * 1/\eta_r = \sum_{n=1}^{N} P_{sch}[n] * 1/\eta_r,$$

wherein n (n=1, 2, 3, . . . , N) is the number of scheduling assignments during a transmission interval with time length TI. The radio transmission of the scheduling assignments is here assumed to last for the duration of the transmission interval, TI. If transmission lasts only part of the interval, the power contribution from that scheduling assignment needs to be reduced in proportion.

The following relations between $E_{TOT}$ and $P_{sch,sum}$ may be used:

If $E_{TOT}$ is the total power in watt and the radio efficiency $\eta_r$ is assumed to vary with $P_{sch,sum}$ $$E_{TOT} = P_{sch,sum} * 1/\eta_r[P_{sch,sum}] = \sum_{n=1}^{N} P_{sch}[n] * 1/\eta_r[P_{sch,sum}];$$

and if a fixed value for the radio efficiency is used:

$$E_{TOT} = P_{sch,sum} * 1/\eta_r = \sum_{n=1}^{N} P_{sch}[n] * 1/\eta_r$$

The parameter $E_{TOT}$ here represents the total power in watts. If the right hand side of the equations is multiplied by the duration TI of the transmission interval, $E_{TOT}$ instead represents the total amount of energy consumed in watt-time units (e.g Joule or kWh). Thus, the total amount of electric energy consumption may be expressed as consumed energy or consumed power.

Said total amount of electric energy consumption during a time period comprising one or more transmission intervals may be split into electric energy consumption for each tenant based on the number of scheduled assignments belonging to each of the tenants and the transmission power scheduled for each assignment during said time period.

The electric energy consumption for each tenant may be estimated by adding the scheduled power $P_{sch}$ during each transmission interval during the time period and averaging, or by multiplying the scheduled power $P_{sch}$ with the transmission interval length TI and adding the energy consumption for each transmission interval of the time period.

The scheduled power $P_{sch}$ may be fixed during a transmission interval according to some radio access standards, e.g. Long Term Evolution (LTE). For LTE, the scheduled power $P_{sch}$ is typically fixed during the time period of a half subframe. The scheduled power $P_{sch}$ during transmission interval may be acquired from an energy per Resource Element value provided by the scheduler.

It is then possible to sum the scheduled power $P_{sch}$ of all scheduled assignments during said transmission interval, which results in the total scheduled transmission power $$P_{sch,sum} = \sum_{n=1}^{N} P_{sch}[n],$$

wherein n (n=1, 2, 3, . . . , N) is the number of scheduling assignments during the transmission interval of length TI.

When the total scheduled transmission power $P_{sch,sum}$ has been calculated, it is then possible to determine the radio efficiency $\eta_r$ as there is a relation between the radio transmission efficiency $\eta_r$ and the total scheduled radio transmission power $P_{sch,sum}$. Said relation may be known by measurement for said radio transmitter design or pre-determined in another way and defined in a table for different values of the total scheduled radio transmission power $P_{sch,sum}$.

The total power (in watt) for a radio efficiency $\eta_r$ is then $$E_{TOT} = P_{sch,sum} * 1/\eta_r(P_{sch,sum}) = \sum_{n=1}^{N} P_{sch}[n] * 1/\eta_r(P_{sch,sum})$$

The total electric energy consumption (in watt-time unit) during a time interval duration TI is then $$E_{TOT} = P_{sch,sum} * TI/\eta_r(P_{sch,sum}) = \sum_{n=1}^{N} P_{sch}[n] * TI/\eta_r(P_{sch,sum})$$

To improve the accuracy of the estimation of $\eta_r$, the transmitted power for reference signals, etc. (e.g. used in systems operating according to LTE) and similar signaling may also be included in $P_{sch,sum}$.

By including the transmitted power for reference signals, etc. in $P_{sch,sum}$, it may also be taken into account in summing the energy consumption, and possibly assigned to different tenants in proportion to the power of their scheduling assignments. Alternatively, it may be assigned in equal proportion to tenants, or assigned according to some other suitable ground.

In a simple structure, there is one radio unit and one scheduler per tenant. In such a case the full consumption of each radio unit is assigned to its respective tenant, and there is no need to split the consumption of one radio onto different tenants.

In a structure where a radio unit is shared by multiple tenants the power consumption of a particular tenant may for example be determined by dividing the sum of the power scheduled for that tenant by the sum of the power scheduled for all tenants and then multiplying by the total power consumption determined as above (which as explained above may include overhead such as power for reference signals, etc.), thus assigning the overhead power to tenants in proportion to scheduled power.

The electric loss $E_{Loss,tr}$ in the set of radio transmitters may be calculated by determining by using an estimation of electricity loss $E_{Loss,tr}$ based on scheduled transmission electricity consumption $E_{tr,TOT}$:

$$E_{Loss,tr} = E_{tr,TOT} * (1 - \eta_r)$$

The electric loss $E_{Loss,tr}$ in the set of radio transmitters is determined by using an estimation of electricity loss $E_{Loss,tr}$ based on scheduled transmission electricity consumption $E_{tr,TOT}$, i.e. the share of consumed electric power in the radio which is not radiated will become heat loss.

If power used for cooling is to be assigned to tenants, this may be made according to the radio transmitter electric loss caused by each tenant's scheduled power, e.g. in proportion to the scheduled power of each tenant.

Figure 5:
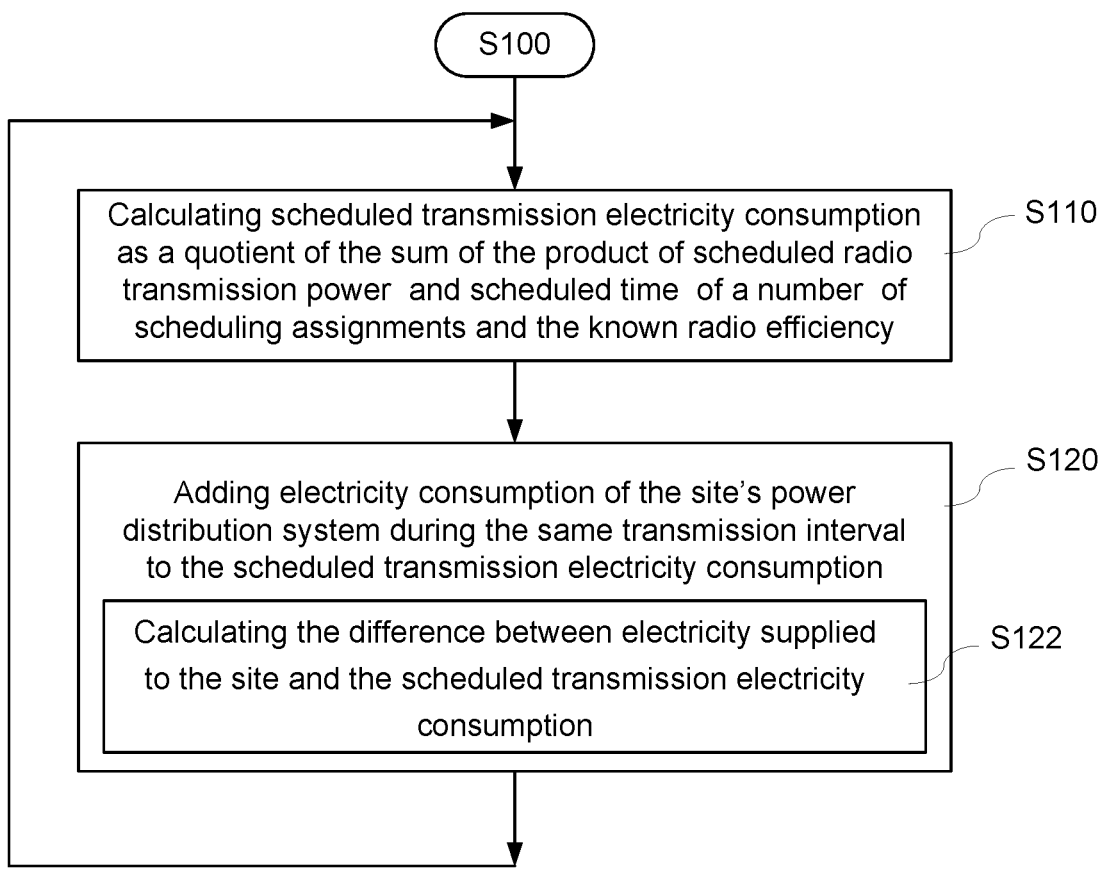
FIG. 5 is flowchart of another embodiment of the method S100.

FIG. 5 is flowchart of another embodiment of the method S100 for estimating electricity consumption $E_{TOT}$.

The method S100 for estimating the electricity consumption $E_{TOT}$ during a transmission interval may further comprise the adding of the consumption of the site's power distribution system or part of the site's power distribution system. Then, the method may comprise the step of:

S120:—Adding electricity consumption $E_{PDI}$ of the site's power distribution system during the same transmission interval to the scheduled transmission electricity consumption $E_{tr,TOT}$.

Thus, the electricity consumption $E_{TOT}$ is calculated by $$E_{TOT} = E_{tr,TOT} + E_{PDI}$$

The electricity consumption $E_{PDI}$ of the site's power distribution system during the same transmission interval may be calculated by using the step of:

S122:—Calculating the difference between electricity supplied $E_{tot,in}$ to the site and the scheduled transmission electricity consumption $E_{tr,TOT}$.

The electricity supplied $E_{tot,in}$ may be measured at one or more power supply inputs and provided to the controller.

Another way of determining the electricity consumption of the power distribution system (i.e. distribution system loss) is to use a fixed efficiency figure, or an efficiency that is a function of the distributed power. The efficiency figure or function may e.g. be calculated from design data or pre-measured. The loss may be determined as the difference between the distributed power and the distributed power divided by the efficiency, i.e.

$$E_{Loss,dist} = E_{tr,TOT} * (1 - \eta_{dist}) / 1 \eta_{dist}$$

wherein $\eta_{dist}$ is the efficiency of the distribution system (abbreviated dist).

According to one embodiment of the method S100 comprising a method S150 for calculating a tenant's site electricity consumption share.

In step S110, following equation may therefore be used:

$$E_{tr,TOT} = P_{sch,sum} * 1/\eta_r = \sum_{n=1}^{N} P_{sch}[n] * 1/\eta_r,$$

wherein n (n=1, 2, 3, . . . , N) is the number of scheduling assignments during a transmission interval.

Said total amount of electric energy consumption during a time period comprising one or more transmission intervals may be split into electric energy consumption for each tenant based on the number of scheduled assignments belonging to each of the tenants and the transmission power scheduled for each assignment during said time period.

The electric energy consumption for each tenant may be estimated by adding the scheduled power $P_{sch}$ during each transmission interval during the time period and averaging or by multiplying the scheduled power $P_{sch}$ with the transmission interval length and adding the energy consumption for each transmission interval of the time period.

In a simple structure, there is one radio unit and one scheduler per tenant. In such a case the full consumption of each radio unit is assigned to its respective tenant, and there is no need to split the consumption of one radio onto different tenants.

Thus, for each of said tenants k the scheduled transmission electricity consumption during a time period of time length $T_P$ by using the formula $$E_{tr,TOT} = P_{sch,sum} * 1/\eta_r = \sum_{n=1}^{N} P_{sch}[n] * 1/\eta_r$$

may be defined as $$E_{tr,TOT,ten}^{k,Tp} = \sum_{l=1}^{L} P_{sch,sum}^{k}[l]/\eta_r = \sum_{l=1}^{L} \sum_{n=1}^{N} P_{sch}^{k}[n]/\eta_r$$

(as power, e.g. watts) or $$E_{tr,TOT,ten}^{k,Tp} = \sum_{l=1}^{L} P_{sch,sum}^{k}[l] * TI/\eta_r = \sum_{l=1}^{L} \sum_{n=1}^{N} P_{sch}^{k}[n] * TI/\eta_r$$

(as energy, e.g. Joule, kWh)

wherein n (n=1, 2, 3, . . . , N) denotes the scheduling assignments for tenant k during the transmission interval l of time length TI=TI[l], $P_{sch}^{k}[n]$ is the scheduled power of scheduling assignment n for tenant k in time interval l. $T_P$ is a time period consisting of a number l (l=1, 2, 3, . . . , L) of consecutive transmission intervals TI[l], each of length TI.

It is thereafter possible to estimate the total scheduled transmission electricity consumption $E_{tr,TOT,site}^{Tp}$ of the transmission site or part of the transmission site during the preset passed time period $T_P$ as the sum of each tenant's total transmission electricity consumption $E_{tr,TOT,ten}^{k,Tp}$ used during said preset passed time period by using:

$$E_{tr,TOT,site}^{Tp} = \sum_{k=1}^{K} E_{tr,TOT,ten}^{k,Tp}$$

It is now possible to estimate a tenant's k relative share $SH_{ten}^{k}$ of the electricity consumption during the preset passed time period $T_P$ as the quotient of a tenant's k transmission electricity consumption $E_{tr,TOT,ten}^{k,Tp}$ and the total transmission electricity consumption $E_{tr,TOT,site}^{Tp}$ of the transmission site or part of the transmission during the preset passed time period $T_P$, by means of the equation:

$$SH_{ten}^k = \frac{E_{tr,TOT,ten}^{k,Tp}}{E_{tr,TOT,site}^{TP}}$$

The method S150 comprises step S152, wherein the total electricity consumption $E_{TOT}^{Tp}$, for the transmission site or part of the transmission site during the preset time period $T_P$ is calculated by summing the total transmission electricity consumption $E_{tr,TOT,site}^{Tp}$ and calculated power consumption $E_{PDI}^{Tp}$ in the site power distribution system during the preset time period $T_P$:

$$E_{TOT}^{Tp} = E_{tr,TOT,site}^{Tp} + E_{PDI}^{Tp}$$

For calculating a tenant's site electricity consumption absolute share $E_{site,ten}^{Tp}$ of the electricity consumption $E_{TOT}^{Tp}$ of a number of tenants k (k=1, 2, 3, . . . , K) using the site or part of the site during a preset passed time period $T_P$ comprising passed consecutive transmission intervals TI, the tenant's absolute site electricity consumption share $E_{site,ten}^{Tp}$ is calculated in step S154 as the tenant's relative share $SH_{ten}^k$ of the electric consumption multiplied with the total power consumption $E_{TOT}^{Tp}$ for the transmission site or part of the transmission site during the preset time period $T_P$:

$$E_{site,ten}^{Tp} = SH_{ten}^k * E_{TOT}^{Tp}$$

Figure 6:
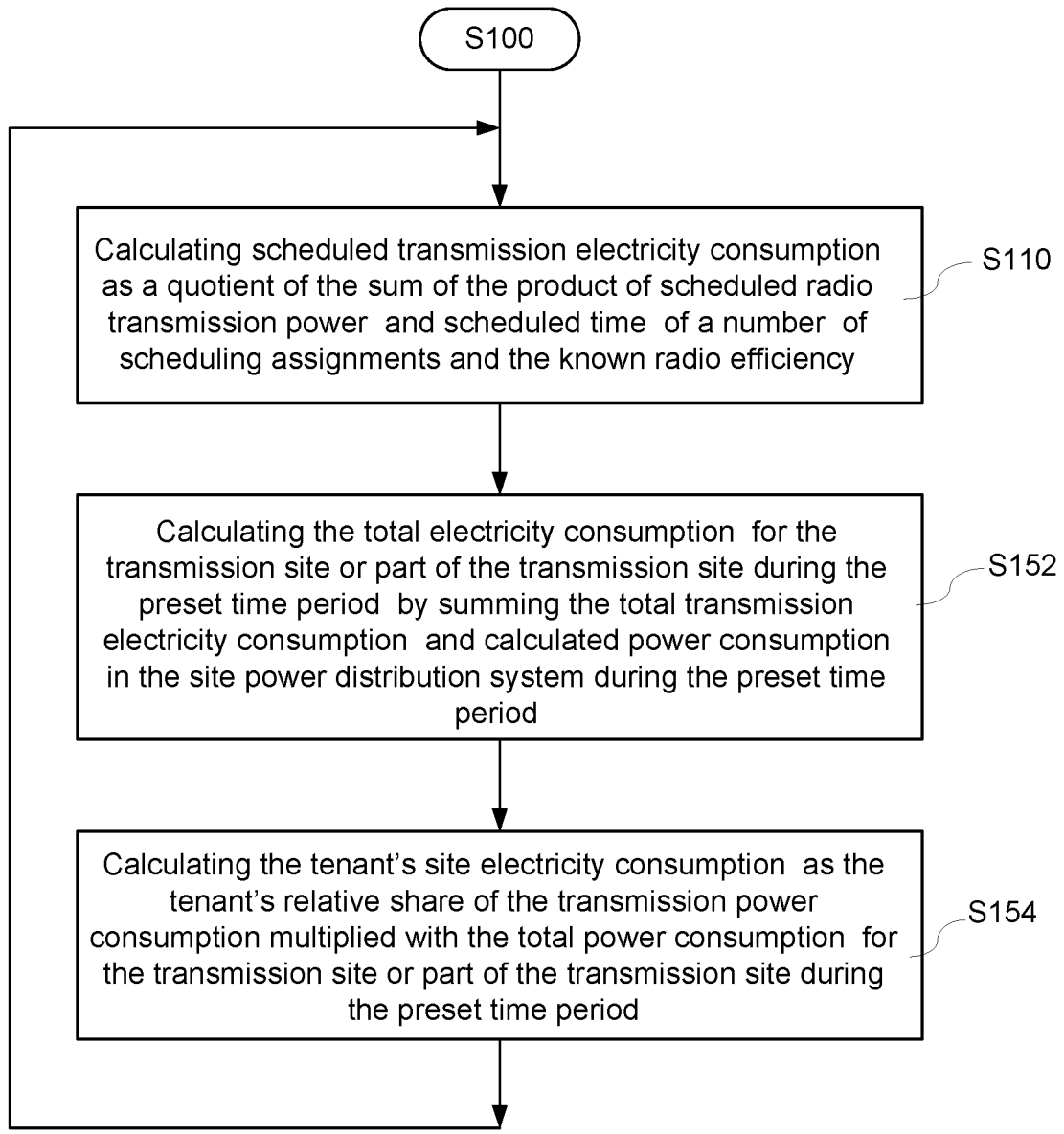
FIG. 6 is flowchart of an embodiment of the method S150 for calculating a tenant's site electricity consumption share.

FIG. 6 is flowchart of the above described embodiment of the method S100 for calculating a tenant's site electricity consumption share.

For calculating a tenant's site electricity consumption $E_{site,ten}^{Tp}$ of the electricity consumption $E_{TOT}^{Tp}$ of a number of tenants k (k=1, 2, 3, . . . , K) using the site or part of the site during a preset passed time period $T_P$ comprising passed transmission intervals, the method S150 comprises:

S152:—Calculating the total electricity consumption $E_{TOT}^{Tp}$ for the transmission site or part of the transmission site during the preset time period $T_P$ by summing the total transmission electricity consumption $E_{tr,TOT,site}^{Tp}$ and calculated power consumption $E_{PDI}$ in the site power distribution system during the preset time period $T_P$;

S154:—Calculating the tenant's site electricity consumption $E_{site,ten}^{Tp}$ as the tenant's relative share $SH_{ten}^k$ of the power consumption multiplied with the total power consumption $E_{TOT}^{Tp}$ for the transmission site or part of the transmission site during the preset time period $T_P$.

Thus, the distribution system power loss may be assigned to tenants in proportion to each tenant's radio transmission power consumption as determined from scheduler data.

In a setup where PSUs and radios are not shared between tenants, losses may be determined separately for the devices used by each tenant and assigned to that tenant only.

The above described methods may be implemented in digital electronically circuitry, or in computer hardware, firmware, software, or in combinations of them. Apparatus may be implemented in a computer program product tangibly embodied in a machine readable storage device for execution by a programmable processor; and method steps may be performed by a programmable processor executing a program of instructions to perform functions of the technique by operating on input data and generating output.

The methods may advantageously be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language.

Generally, a processor will receive instructions and data from a read-only memory and/or a random access memory. Storage devices suitable for tangibly embodying computer program instructions and data include all forms of non-volatile memory, including by way of example semiconductor memory devices, such as EPROM (erasable programmable read only memory), EEPROM (electrically erasable programmable read only memory), and flash memory devices; magnetic disks such internal hard disks and removable disks; magneto-optical disks; and CD-ROM (Compact Disc Read-Only Memory) disks. Any of the foregoing may be supplemented by, or incorporated in, specially—designed ASICs (Application Specific Integrated Circuits).

Figure 7:
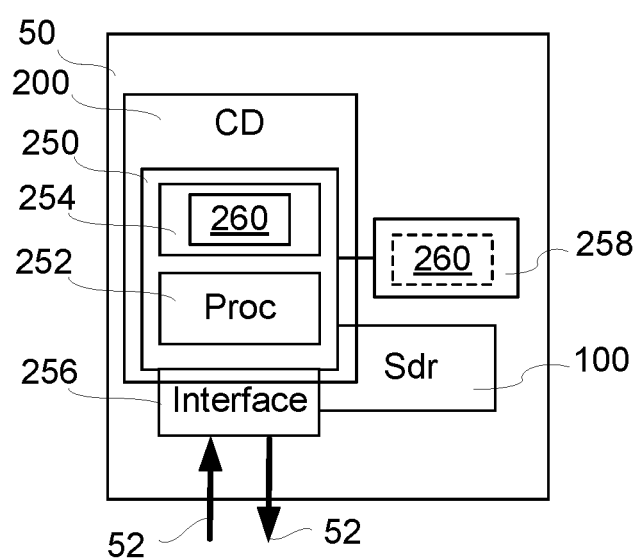
FIG. 7 is a block diagram illustrating an energy control device capable of performing the method S100.

FIG. 7 is illustrating an energy control device capable of performing the methods S100 and S150.

A transmission site comprises a controller 50, as already are illustrated in FIGS. 2 and 3. The controller 50 comprises an energy control device 200, a scheduler (Sdr) 100, memory storage 258, and an interface 256.

The energy control device 200 is illustrated as a part of the controller 50, but it may be arranged as a stand-alone component but which is connected with data links or data buses to the controller for being able to exchange data and information with the controller and scheduler.

The energy control device 200 comprises a processing circuitry 250, which comprises a processor 252 and memory storage 254 for storing computer program instructions as code and data for enabling the processing of the incoming data. The processor 252 is preferably a programmable processor. The processor 252 will receive instructions and data from the memory storage 254 implemented by a read-only memory and/or a random access memory. Storage devices suitable for tangibly embodying computer program instructions and data include all forms of non-volatile memory.

Further, one memory storage 258, e.g. a Cache memory, is connected to the processing circuitry 250 for storing different data information to be used and processed in the method S100.

The processing circuitry 250 is capable of controlling different functional blocks or units in the RBS via interface 256 and a number of digital buses 52 connected to the functions blocks and units.

The energy control device 200 comprises a processor 252 in a processing circuitry 250 being operative to perform the step of:

Estimating scheduled transmission electricity consumption $E_{tr,TOT}$ based on a quotient of a sum $P_{sch,sum}$ of scheduled radio transmission powers $P_{sch}$ and the radio efficiency $\eta_r$.

It is further herein provided a computer program 260. Said computer program comprises computer program code which, when run in a processor 252 of a processor circuitry 250 of an energy control device 200, causes the device 200 to perform the steps of the methods S100 and S150.

A computer program product 258 is also provided. The computer program product comprises a computer program 260 and a computer readable means 254, 258 on which the computer program is stored. Said computer program comprises computer program code which, when run in the processor 252 of the processor circuitry 250 of an energy control device 200, causes the device 200 to perform the steps of the methods S100 and S150.

According to further one aspect, a carrier containing a computer program 260, wherein the carrier is one of an electronic signal, optical signal, radio signal or computer readable storage medium. Said computer program comprises computer program code which, when run in a processor circuitry of a RBS device, causes the RBS to perform steps of the method S100 and S150.

Figure 8:
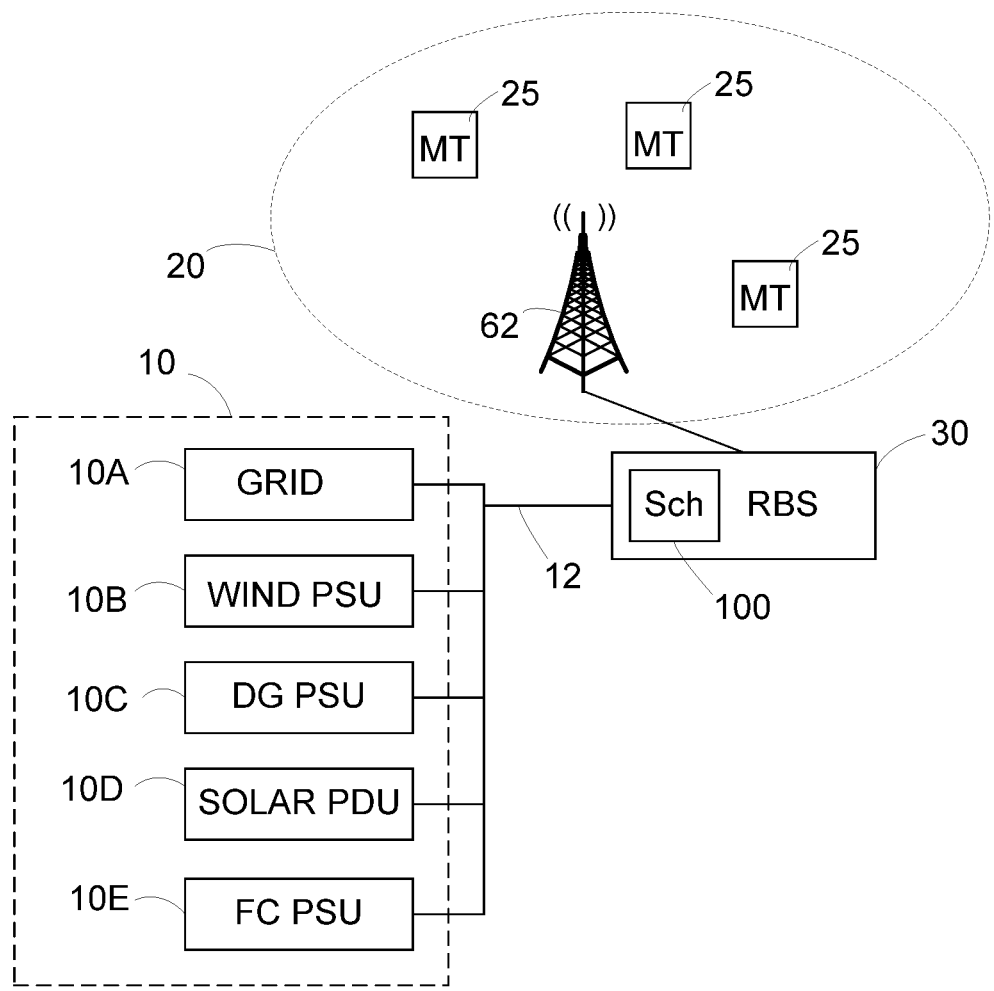
FIG. 8 is a block diagram of a transmission site in which devices and methods described herein may be implemented.

FIG. 8 is illustrating a transmission site, comprising a RBS, 30 and RBS transmitters 62 serving a cell area 20 comprising a number of wireless devices, such as e.g. user equipment and mobile terminals MTs 25. The Radio Base Station, RBS, comprises a scheduler 100 for handling the traffic load in Downlink DL and Uplink UL between the transmitters 62 and MTs 25. The transmission site 20 is electrically powered from an external power feed, e.g. an AC (Alternating Current) power grid or other energy source. As illustrated, the transmission site is connected to external power feed 10 via a cable 12. The power feed 10 may in the future comprise energy sources such as Alternating Current AC grid 10A, Wind generated electricity 10B, Diesel Generated, DG, 10C, solar cell 10D, Fuel Cell FC 10E, etc.

Today's energy power management control method does not include a control arrangement of the sustainable and other energy sources at the telecom site from a radio traffic point of view.

By not controlling the energy sources dynamically with traffic, the power sources that are connected in the power chain are "always on". This creates inefficiencies in the power distribution and does not contribute to any energy savings.

When one energy source is on standby, the unit consumes idle power which means that the power chain is active, but does not deliver power.

For future demands in 5G applications with rapid traffic grow, an intelligent management control arrangement is needed to improve the energy performance for Node power and sustainable energy sources.

A problem with the current solution is that there is no dynamic control of the alternative energy sources, e.g. sustainable energy sources, the grid, diesel generators, etc., in the power system from the RBS. This absence creates inefficiency regarding energy management and power savings that decreases the total operating efficiency of the system. A number of problems with existing energy management are listed hereafter:

1) The power management solutions suffer from the absence of power management features between the radio/digital baseband and the alternative and other energy sources on site.
2) Today there is no traffic based method and arrangement to control the sustainable and other energy sources on site level in a telecommunication site.
3) 3PP (Third Party Products) are not integrated in the management system and control. This causes low efficiency of the power system.
4) An energy unit that does not deliver power to the Node may still be active, "always on" and not contributing to energy saving. This causes extra idle power that is wasted. This does not matter for free energy sources such as wind and solar, but reduces the power system efficiency when other energy sources are used.
5) Inefficient management control, by not knowing the power demand in advance for the next time period. When knowing the power demand in advance, the PSU units of energy sources like grid PSU, or other energy sources, can be turned off, until needed.
6) Today's solution does not calculate the energy headroom for the sustainable and other energy sources, and therefore the current system creates inefficiencies.

The RBS radio power demand varies over time due to the variation in radio traffic. The alternative and other energy sources are not adapted to be controlled from a radio perspective, and do not follow radio traffic demand, to increase power savings.

An inventive method and arrangement for energy control of sustainable and other energy sources described herein, is a method for energy detection, energy estimation, energy headroom allocation and control based on data from the scheduler to co-sequence energy units/sources depending on traffic situation and energy balance in the telecom site.

The method comprises calculating (from radio traffic scheduler) the required power consumption of radio (loads) based on radio traffic information for a coming time interval and determining an operation mode and energy demand for each of said energy sources. The method comprises, based on data from the traffic scheduler controlling the operation mode of each energy source by signalling the operation mode for each energy source.

It could be considered as an energy management control method based on information from the scheduler to control the different energy sources on site is provided, wherein said information is depending on radio traffic load. The energy management control method for every TTI for efficient and effective control is based on real traffic situation.

The method detects the available energy sources that are connected on the communication link in the telecom site and performs an intelligent control and energy demand balancing based on information from the radio traffic scheduler.

Energy estimation is done on the system, depending on input measured data from the energy sources, and the maximum available data (input from capabilities).

Energy headroom estimation is done for the next cycle period, to be able to turn off or on different energy sources that have available energy. The energy headroom calculation also minimizes the risk for over dimensioning of energy sources on site.

The data on needed power, estimated power need, energy headroom and calculated efficiency is stored in a table in a memory. For every next period of cycle the data is stored and thereafter the control of the energy sources is performed based on data from the traffic scheduler.

The method optimizes the utilization of the different sustainable (alternative) and other energy sources that are needed and stored in a table, depending on the traffic conditions from the scheduler.

An energy control device acquires data from the scheduler, the data is used for calculating and determining control signals, which is used for controlling and activating by means of the control signals corresponding energy sources in sequence to match the traffic load. The method turns on the energy source(s) that shall deliver power to the Node, and then turns off the rest of the energy sources, depending on the energy headroom that is calculated in advance, and predefined from scheduler. The scheduler can turn on 2 or more energy source if needed and requested for the next Transmission Time Interval TTI.

The energy sources are also prioritized in the flow arrangement, depending on what is installed at the Node site.

Due to the traffic scheduler or an associated unit being able to calculate the energy of the next coming time interval based on scheduler data, the energy source state/operation mode is therefore known for the next cycle.

Thus the inventive method optimizes the power from energy sources based on the radio traffic, per TTI, by controlling the energy sources.

Internal Node Power units, PSU are also managed by this method.

Figure 9:
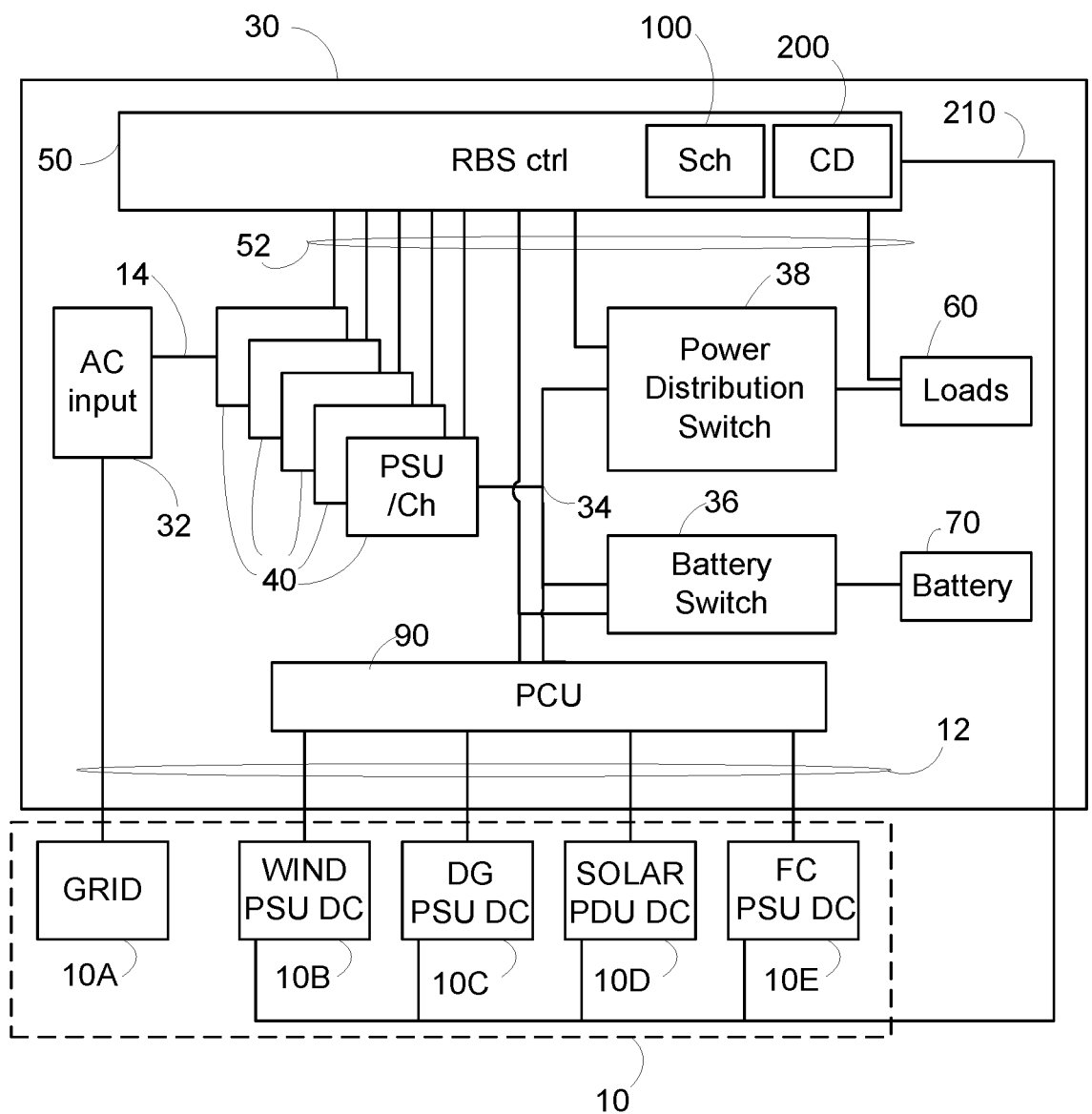
FIG. 9 is a block diagram illustrating an example of a transmission site power management system architecture.

FIG. 9 is a block diagram illustrating an example of a transmission site power management system architecture.

The transmission site, such as RBS, comprises either an eNodeB of a Long Term Evolution (LTE) system, Radio Network Controller (RNC) of a Third Generation (3G) system, Base Station Controller (BSC) of a Global System for Mobile Communication (GSM or 2G) or a Baseband Unit of a Fifth Generation (5G) system.

The operation and functions of a transmission site, or RBS, 30 is handled and controlled by a RBS controller 50, which comprises at least one processor circuitry of digital processors and supporting memory storages for storing computer software and processing data. When said computer software is executed by the digital processors, different functions of a RBS are implemented, such as e.g. handover of mobile terminals between different RBS sites, communication with the mobile stations and a backbone of the RBS enabling communication with different nodes in the Internet, control of different functional blocks or units in the RBS, etc. Some functions may be implemented as hardware. For said purposes, the RBS comprises a number of digital buses 52 connected to the functions blocks and units. In the example of FIG. 9 said function blocks and units consume electric power and could therefore be considered as loads 60. Examples of said loads are radio stages R1, R2, R3 . . . , comprising transceivers (transmitters/receivers), power amplifier circuits and antennas (60 in FIG. 1). The power feeding of said function blocks or units are provided by one or a plurality of power feed circuits or power supply units, PSU, also sometimes denoted as chargers 40. Thus, a Power Supply Unit PSU 40 may be designated for one or more function blocks and units. The PSUs 40 are connected to the external power feed, most probably an AC grid, via a power cable connection 12 via an AC input interface 32, which distribute different phases provided by the AC grid through connections to the input terminals 14 of the PSUs. The PSUs convert the AC power into DC which is distributed to the loads 60 via wiring 34 to power distribution switches 38 enabling to switch off and on the power to different loads 60, i.e. functional blocks and units. Any disturbance in the external power feeding on connection 12 will propagate through the AC input interface 32 to the input terminals 14 of the PSUs 40.

For securing power feeding to the RBS in case of external power failure, the RBS is provided with an internal power feed 70, e.g. an arrangement of batteries capacity adapted to provide enough power capacity to the RBS during a pre-set time of external power feed failure. A switch 36 is provided for connecting and disrupting the power feeding from the internal power 70.

As illustrated in FIG. 9, the control buses 52 are connected between the RBS controller 50 and the functional blocks and units 40, 36, 38, 60 enabling control by the RBS controller and two way communications with said functional blocks and units.

A radio stage may be dedicated to serve only one of the tenants, e.g. R1 is reserved for a tenant T1, while R2 is dedicated to tenant T2, etc. According to another implementation, a stage may be adapted to operate according to a special Radio Access Technology, RAT. More than one tenant may be served by each stage.

As illustrated, the transmission site is connected to external power feed 10 via a cable 12. The power feed 10 may in the future comprise energy sources such as Alternating Current AC grid 10A, Wind generated electricity 10B, Diesel Generated, DG, 10C, solar cell 10D, Fuel Cell FC 10E, etc.

According to the illustrated embodiment, the Wind electricity source 10B, Diesel Generated electricity source 10C, solar cell electricity source 10D, and Fuel Cell electricity source 10E are adapted by means of PSUs/PDUs to deliver DC electricity to the power management system of the transmission site. The outputs of the PSUs/PDUs deliver DC electricity via cables 12, which are connected to a Power Connection Unit PCU 90 that feeds the power distribution switch 38 with electric DC power.

Said PCU 90 may be controlled by the RBS controller 50 by means of an energy control device CD 200 and the radio traffic load scheduled by the scheduler 100. The energy control device is adapted to run an embodiment of the method S100. The PCU and RBS controller is connected via one of the control/data buses 52. The RBS controller 50 comprising the CD 200 is connected to the PSUs/PDUs 10B-10E via a control bus or control link 210. Said bus or link is adapted to communicate control signalling from the RBS controller 50 to the PSUs/PDUs and information data and/or measure data of the PSUs/PDUs in the opposite direction. The RBS controller 50 is adapted to store and/or process said information data and/or measure data.

Figure 10:
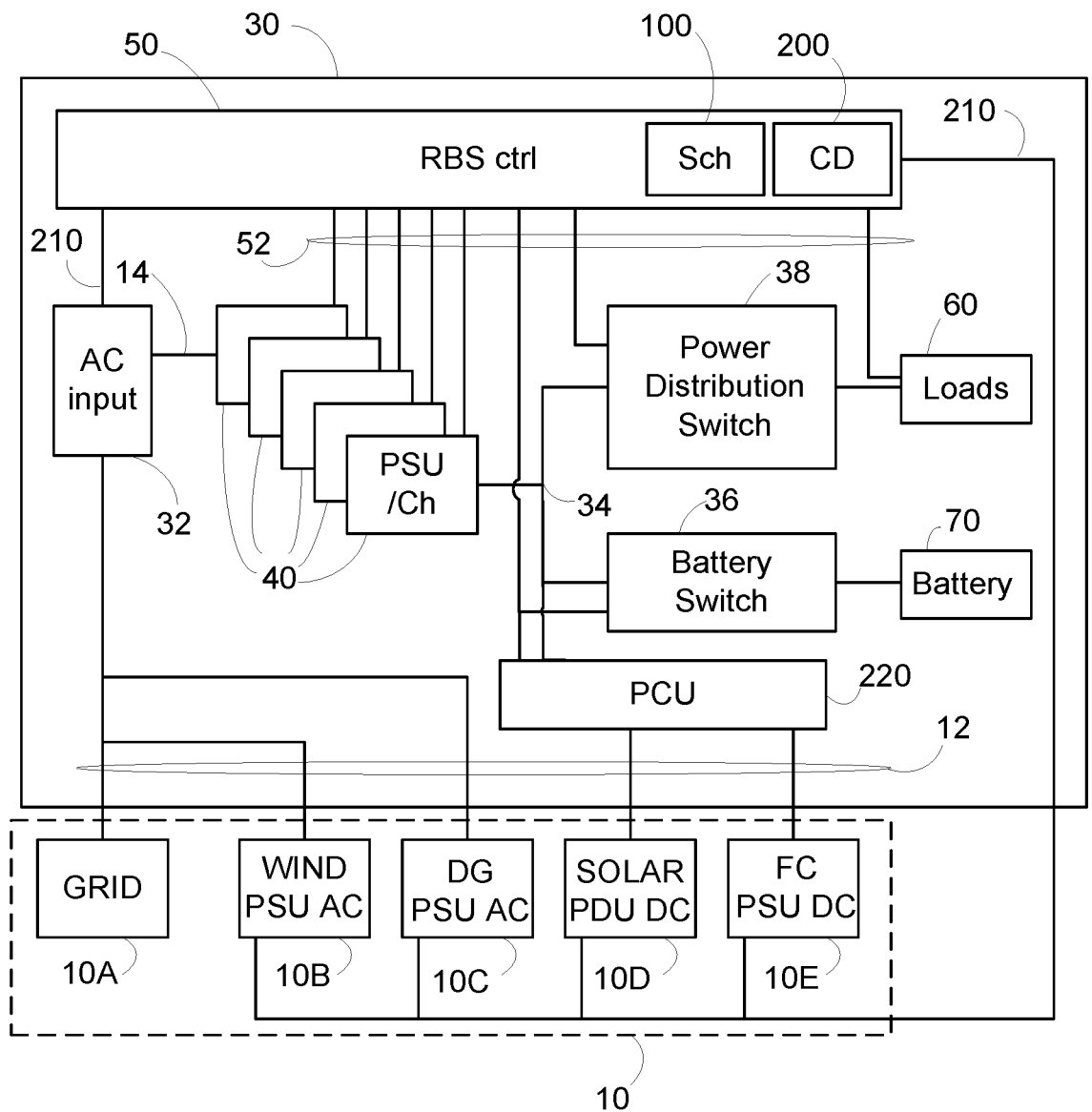
FIG. 10 is a block diagram illustrating an alternative solution of a transmission site power management system.

FIG. 10 is a block diagram illustrating an alternative solution of a transmission site power management system.

According this alternative embodiment, the Wind electricity source 10B and Diesel Generated electricity source 10C are adapted by means of PSUs/PDUs to deliver AC electricity to the power management system of the transmission site, while the solar cell electricity source 10D and Fuel Cell electricity source 10E are adapted by means of PSUs/PDUs to deliver DC electricity to the power management system of the transmission site. The outputs of the PSUs/PDUs deliver DC electricity via cables 12, which are connected to a Power Connection Unit PCU 90 that feeds the power distribution switch 38 with electric DC power. The outputs of the Wind PSU 1 OA and DG PSU 10B is connected to the AC input 32, which is controlled from the RBS controller 50 via a control bus 210. The AC input 32 may be operated as an automatic transfer switch.

The CD 200 may be implemented as computer program software executed on a programmable processor of a processing circuitry. Said computer program comprises computer program code which, when run in a processor of a processor circuitry of an energy control device 200, causes the device 200 to perform the steps of a method S160 for controlling a set of energy sources supplying the transmission site or part of the transmission site with electric power.

Figure 11:
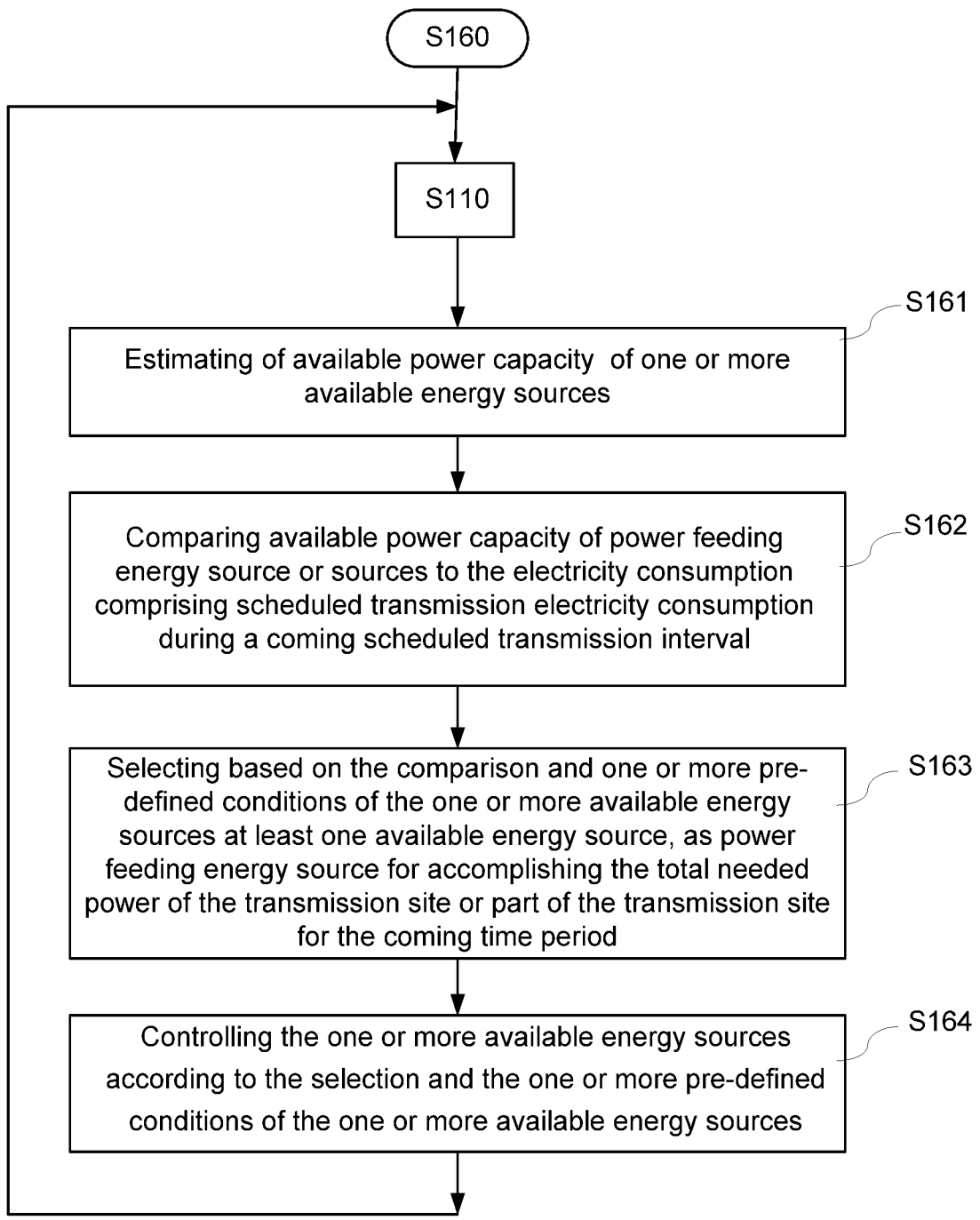
FIG. 11 is flowchart of an embodiment S160 of the method S100.

FIG. 11 is flowchart of an embodiment S160 of the method S100 for controlling a set of energy sources supplying the transmission site or part of the transmission site with electric power. Said method S160 comprises:

S110:—Estimating scheduled transmission electricity consumption $E_{tr,TOT}$ based on a quotient of a sum $P_{sch,sum}$ of scheduled radio transmission powers $P_{sch}$ and the radio efficiency $\eta_r$;

S161:—Estimating of available power capacity $P_{av,cap}$ of one or more available energy sources;

S162:—Comparing available power capacity $P_{av,cap}$ of power feeding energy source or sources to the electricity consumption $E_{TOT}$ comprising scheduled transmission electricity consumption $E_{tr,TOT}$ during a coming scheduled transmission interval TI;

S163:—Selecting based on the comparison and one or more pre-defined conditions of the one or more available energy sources at least one available energy source as power feeding energy source for accomplishing the total needed power of the transmission site or part of the transmission site for the coming time period;

S164:—Controlling the one or more available energy sources according to the selection and the one or more pre-defined conditions of the one or more available energy sources.

Note: More than one energy source may be activated simultaneously, and are controlled by the scheduler.

The estimation of available power capacity $P_{av,cap}$ of one or more available energy sources in step S161 may be based on preset energy source conditions defining the operation mode of at least one of the available energy sources.

The method comprises the calculating and sending of the power demand for the next transmission cycle that is put in an energy source table, see FIG. 12.

By knowing the energy consumption some time in advance, energy sources and their associated devices (such as PSUs) which are not needed may be switched off dynamically and idle energy consumption associated with these sources and devices may be avoided, thus improving efficiency and saving energy.

FIG. 12 is an example of an energy source table to be used.

The method is retrieving information about radio traffic load energy consumption and compares the retrieved with the available power capacity $P_{av,cap}$ data in the table where the data is checked and stored in advantage.

Thus, the energy source table is a matrix. In the left column of the table, the power need for the next time period, e.g. a certain number of TTIs (Transmission Time Intervals) in advance, and the energy sources are listed. In the example, the selectable energy sources are wind, sun, grid, Fuel Cell (FC), Diesel Generator (DG) and Battery. In the top row, different parameters are list: Available Power [Watt], Efficiency [%], 1) Power Need [Watt], 2) Power Need [Watt], Energy headroom [Watt hour], Start time of energy source, 3) Power need [Watt], Time remaining [hour], Wind speed [meter/second], Irradiation [Watt/square meter], Frequency variation and Cost/KWh (the price per kilowatt-hour). Some of the places in the table will not have any parameter value, which is indicated as "NA" meaning "not available" or not used.

Available Power is the maximum available power that a power source may deliver. However, due to losses in the power chain, it is necessary to consider the power line efficiency of each energy source. The column "1) Power need" indicates the value in Watt that each energy source for the moment delivers to the transmission site. Thus, "1) Power need" corresponds to the momentary power amount used from each energy source. The column "2) power need" corresponds to the estimation (in step S110) of scheduled transmission electricity consumption $E_{tr,TOT}$ based on a quotient of a sum $P_{sch,sum}$ of scheduled radio transmission powers $P_{sch}$ and the radio efficiency $\eta_r$.

It corresponds to the total future value of the electricity consumption of the transmission site RBS or part of the site.

Figure 15:
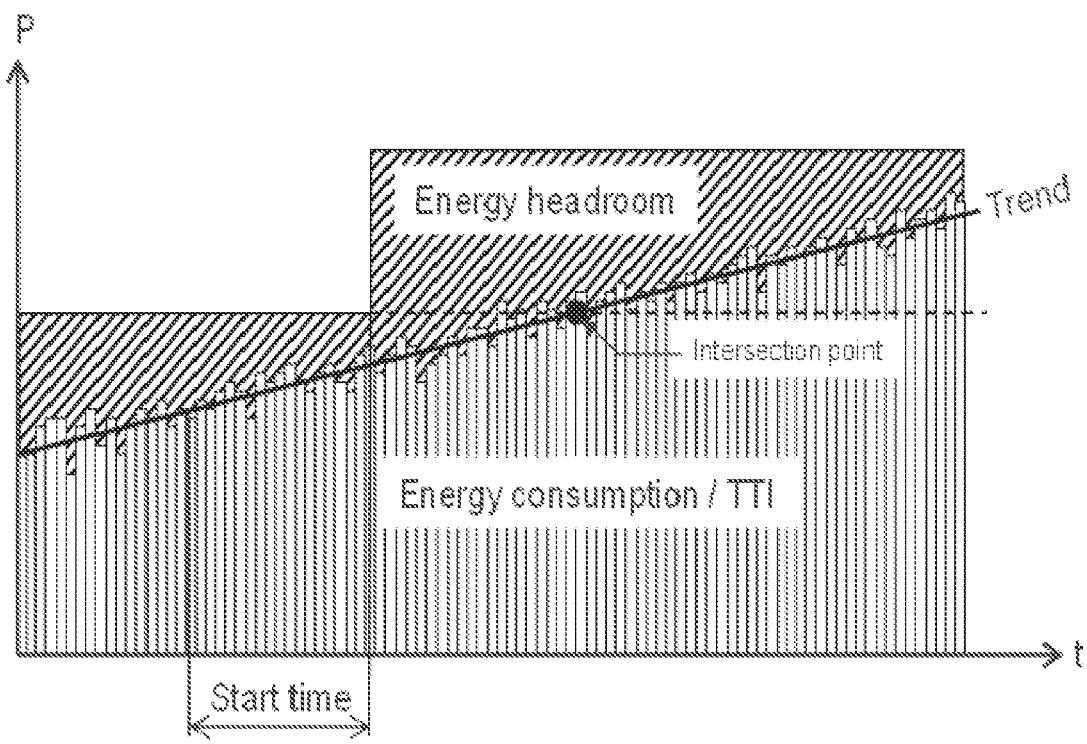
FIG. 15 is a diagram of energy consumption per transmission time interval, TTI.

The energy headroom, see also FIG. 15, is defined as the difference between available energy and consumed energy, the energy control device can predict and prioritize the usage of the energy sources, by turning them on or off. Thereby the idle power is removed from each energy source in off state and this contributes to the total energy efficiency of the system.

The column "start time of energy source" is indicating the start up time in seconds for slow starting energy sources, e.g. diesel motor driven electric generators (DG), fuel cell (FC), etc. The start time is in other words indicating the delay from start up till the energy source deliver full effect.

The column 3) Power need is the in step S161 estimated values of available power capacity $P_{av,cap}$ of one or more available energy sources.

Time remaining, start time of energy source, wind speed, irradiation, frequency variation and cost per kilowatt-hour are conditions that are considered when, in S163, selecting based on the comparison and one or more pre-defined conditions of the one or more available energy sources at least one available energy source as power feeding energy source for accomplishing the total needed power of the transmission site or part of the transmission site for the coming time period.

Time remaining indicates for each energy source where it is appropriate or available how much time that is left for an energy source to deliver its full power, e.g. battery time left, time to diesel tank is empty, etc.

The "wind speed" is a measured value of the wind speed, momentary or an average value, which is used for calculating available power from the wind energy source.

The "Irradiation" value is a measured value of the suns irradiation, which is used for calculating available power from the solar energy source.

Further, the table may contain a column indicating measured and/or calculated frequency variations of the different energy sources. The frequency variation value is a measure of the stableness of an energy source. If the frequency variation for an energy source exceeds a certain threshold value, the condition for said energy source is deemed to be unstable, and said energy source may not be selected for delivering power to the RBS within the coming time period, wherein the one or more available energy sources are controlled according to the selection and the one or more pre-defined conditions of the one or more available energy sources, step S164.

The transmission site's power management system and energy sources are acting as slaves controlled by signaling from the RBS controller comprising the (radio traffic) scheduler. The control of the one or more available energy sources 10 according to the selection and the one or more pre-defined conditions of the one or more available energy sources may be performed by setting the PSU or PDU of the energy sources to active or non-active via the bus 210.

The estimation of available power capacity $P_{av,cap}$ of one or more available energy sources in step S161 may further be based on malfunction detection of a feeding energy source and the activation of another available power.

The method checks the best power system chain efficiency for the specified cycle, by measuring the equipment and distribution efficiency from energy sources to the loads. The data is stored in the table for a certain number of TTIs in advance, For every new TTI cycle a new table is generated.

The data stored in the table may be compared in different ways with each other to set the best available and efficient energy source that can deliver power.

Said table may comprise a sequence of measurements and calculated data points from the scheduler and the energy sources. The table stores the energy demand for next TTI, and the energy headroom that is calculated to efficiently select the optimal energy source.

The table may include different variables and data depending on energy source, as availability, solar radiation, grid availability, good or bad grid status, and backup time reaming.

The following data may be required and stored in the table: (parameters may be added or removed in the example):
   Wind: Wind speed (m/s), power (W), efficiency (%)
   Sun: Irradiation (W/m$^2$), power (W), efficiency (%)
   Grid: Grid availability (good/bad), W, efficiency (%)
   FC: Power (W), efficiency (%), time remaining (h)
   DG: Power (W), efficiency (%), time remaining (h) (diesel fuel left)
   Battery: Power (W), efficiency (%), time remaining (h)
   Cost: (SEK/kWh) On energy input.

Different condition states activate different energy sources, depending on data input.

Figure 13:
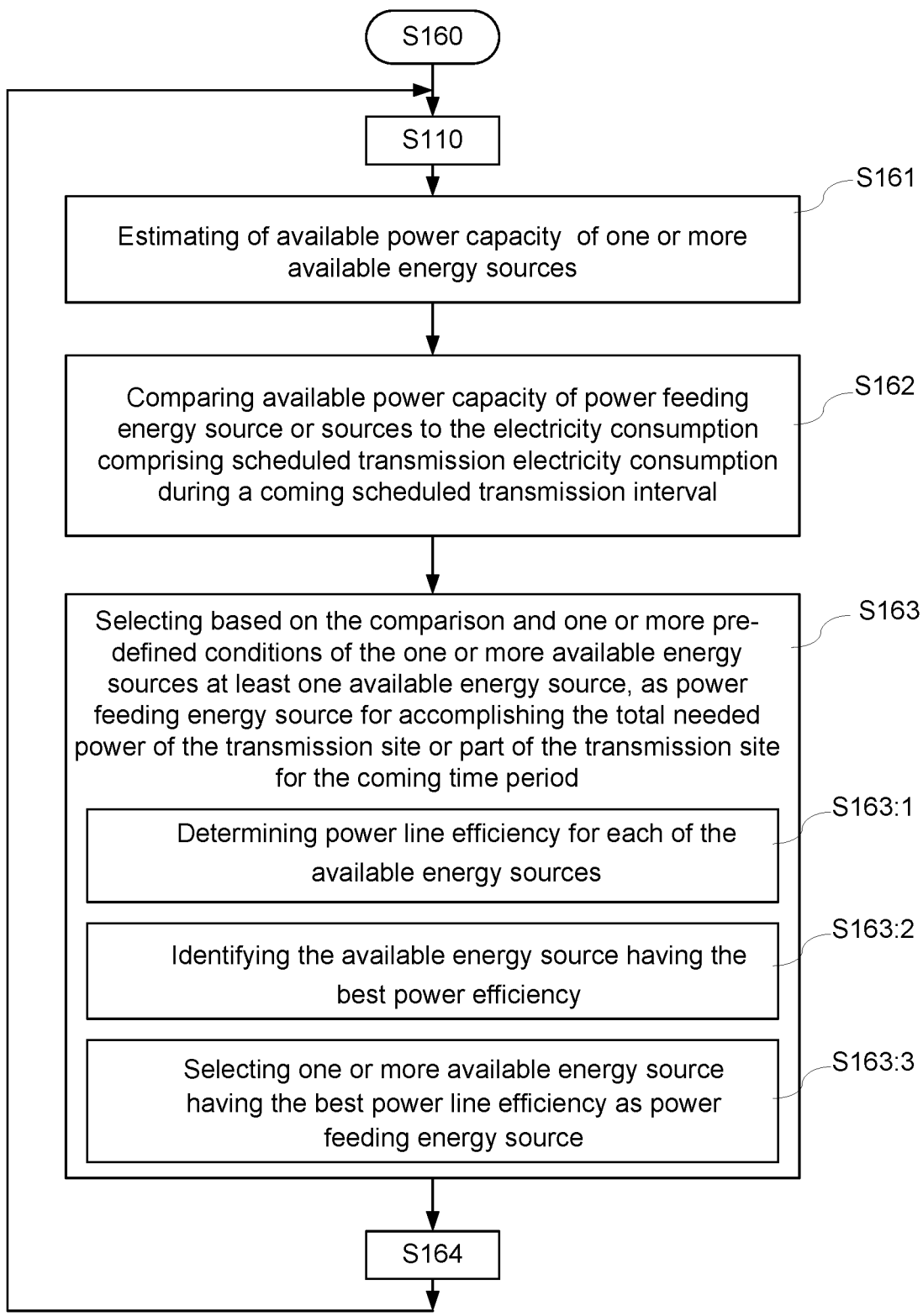
FIG. 13 is flowchart of another embodiment S160 of the method S100.

FIG. 13 is flowchart of another embodiment S160 of the method S100 for controlling a set of energy sources supplying the transmission site or part of the transmission site with electric power. One of said conditions for selecting one or more energy sources is power line efficiency. The selecting step S163 may therefore comprise:
S163:1—Determining power line efficiency for each of the available energy sources;
S163:2—Identifying the available energy source having the best power efficiency;
S163:3—Selecting one or more available energy source having the best power line efficiency as power feeding energy source.

The operator pre-defined conditions and prioritizations are checked according to the method.

The variety of conditions and operating conditions for every energy source is included. Such conditions can be DG+battery operation, battery+grid operation conditions, battery charge cycles operation or extended battery life.

Figure 14:
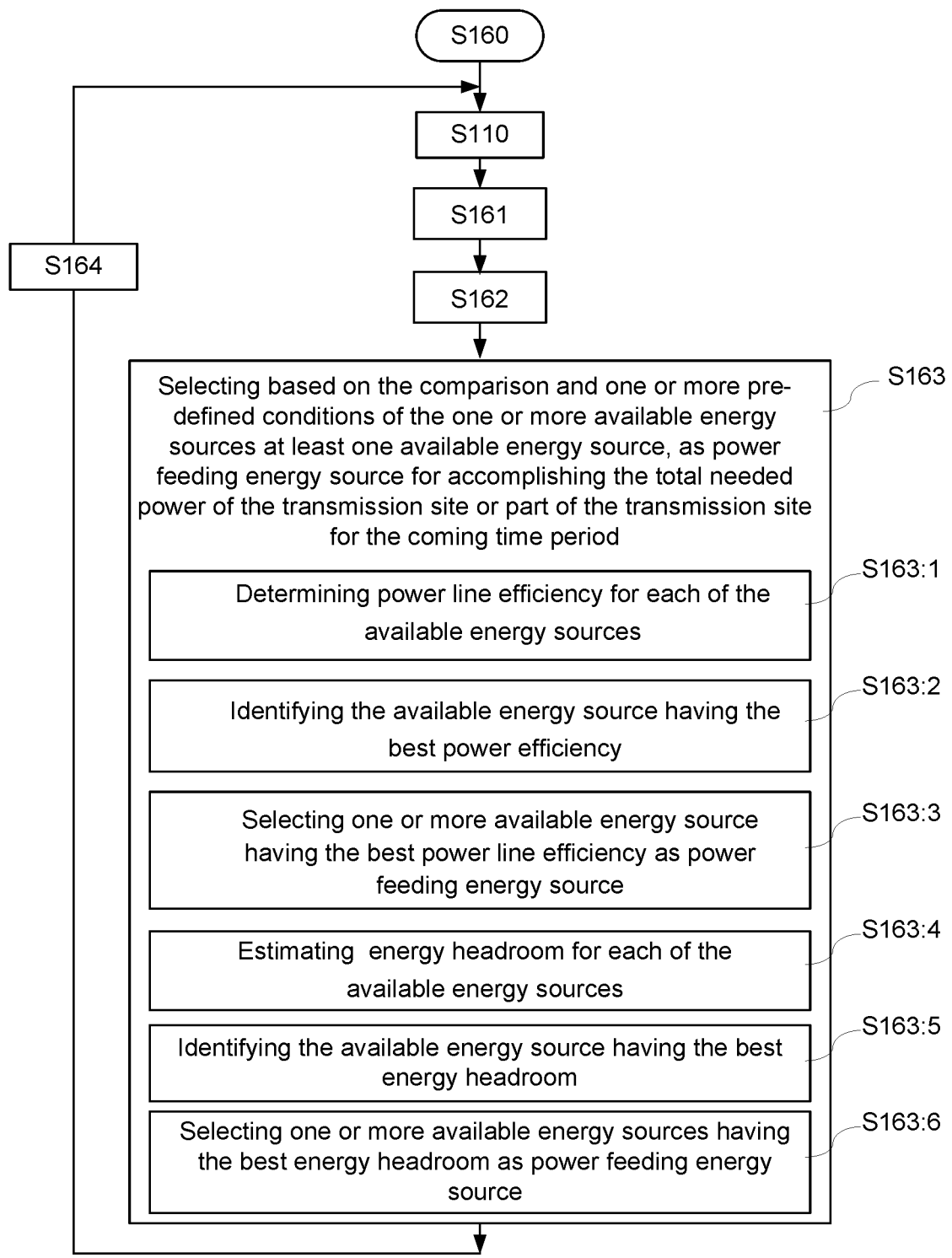
FIG. 14 is flowchart of another embodiment S160 of the method S100.

The defined conditions in Node can be for example
Condition 1: Activate most efficient rectifier in Node
Condition 2: Feature dependent deactivation
Condition 3: Battery charge mode
Energy source user conditions can be:
Condition 1: Activate most efficient power line source
Condition 2: Feature dependent deactivation
Condition 3: Battery charge mode
Condition 4: On/off mode FIG. 14 is flowchart of another embodiment S160 of the method S100.

One of said conditions for selecting one or more energy sources may be energy head headroom, which is the difference between the maximum stated power capacity and the power delivered by the energy source for the moment. The selecting step S163 may therefore comprise the step of:
S163:4—Estimating energy headroom for each of the available energy sources;
S163:5—Identifying the available energy source having the best energy headroom;
S163:6—Selecting one or more available energy sources having the best energy headroom as power feeding energy source.

The method maintains an energy efficiency and energy balance equilibrium in the RBS and the energy equipment sources both for slow start and fast start energy sources by controlling and turning on the energy sources that shall deliver power to the transmission site, and turns off the rest of the energy sources, depending on the energy headroom, which is calculated in advance and are predefined by the energy control device. The energy control device is able to calculate the power of the next coming time interval. The energy source state/operation mode is therefore possible to control for the next cycle.

The method is based on control of multiple energy sources, both for slow starting and fast starting. Wind and solar energy sources are free and dependent on wind speed and solar irradiation. For wind and solar energy sources the efficiency gain is limited, but these sources are still controlled by the energy control device and the scheduler is included in the method to control the utilization of the energy sources for the next TTI, based on information from the radio traffic scheduler. The method may prioritize free energy sources as wind and solar as the best energy headroom.

The mechanism for energy saving may eliminate idle power consumption, by turning off the power converters, based on info/control from the radio traffic scheduler for the next TTIs. The energy saving principle is most beneficial in a grid/battery power system configuration.

FIG. 15 is a diagram of energy consumption per transmission time interval, TTI.

In the method and energy headroom calculation, energy headroom is defined as the difference between available energy and consumed energy, the energy control device can predict and prioritize the usage of the energy sources, by turning them on or off. Thereby the idle power is removed from each energy source in off state and this contributes to the total energy efficiency of the system. The method and energy control device can turn on as many energy sources as needed based on the request for the next TTI. Stand by power and idle power is wasted energy. The energy sources do not need to be in standby mode and waste energy. By calculating the energy headroom in advance the energy sources can be activated some cycles in advance, before radio transmission is performed. For slow starting energy sources, such as DG and FC, the calculation is based on the energy headroom trend. If the energy headroom trend is decreasing, the energy control device is adapted to calculate the start time needed to start up by trigger the slow starting energy source so that it can be started in advance and be available before the intersection point (where energy headroom=0) is reached.

Slow starting energy sources (e.g. DG and FC) are also handled by the method but based on long term energy head room calculations and long term TTI power consumption rising trends (e.g. at the beginning of the "busy hour"). The principle is based on activating energy sources in advance to avoid reaching the intersection point (where power consumption risks exceeding available power) and maintaining a positive energy headroom.

Figure 16:
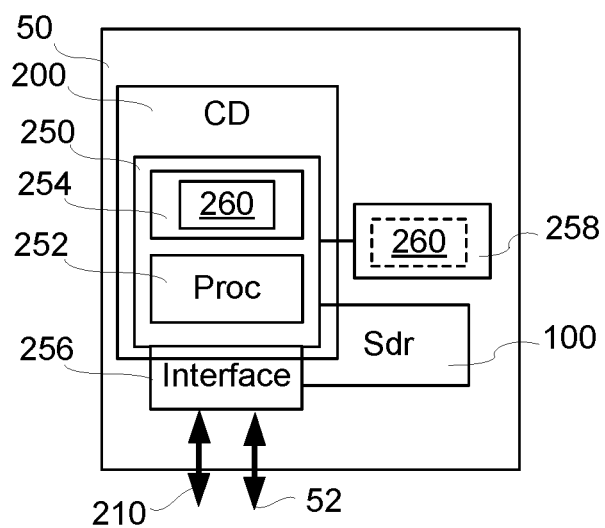
FIG. 16 is a block diagram illustrating an energy control device capable of performing the method S160 and embodiments thereof.

FIG. 16 is illustrating an energy control device capable of performing the method S160 and embodiments thereof.

A transmission site comprises a controller 50, as already are illustrated in FIGS. 2 and 3. The controller 50 comprises an energy control device 200, a scheduler (Sdr) 100, memory storage 258, and an interface 256.

The energy control device 200 is illustrated as a part of the controller 50, but it may be a arranged as a stand-alone component but which is connected with data links or data buses to the controller for being able to exchange data and information with the controller and scheduler.

The energy control device 200 comprises a processing circuitry 250, which comprises a processor 252 and memory storage 254 for storing computer program instructions as code and data for enabling the processing of the incoming data. The processor 252 is preferably a programmable processor. The processor 252 will receive instructions and data from the memory storage 254 implemented by a read-only memory and/or a random access memory. Storage devices suitable for tangibly embodying computer program instructions and data include all forms of non-volatile memory. Further, one memory storage 258, e.g. a Cache memory, is connected to the processing circuitry 250 for storing different data information to be used and processed in the method S100.

The processing circuitry 250 is capable of controlling different functional blocks or units in the RBS via interface 256 and a number of digital buses 52, 210 connected to the functions blocks and units.

The energy control device 200 comprises a processor 252 in a processing circuitry 250 being operative to perform the steps of:

Estimating scheduled transmission electricity consumption $E_{tr,TOT}$ based on a quotient of a sum $P_{sch,sum}$ of scheduled radio transmission powers $P_{sch}$ and the radio efficiency $\eta_r$;

Estimating of available power capacity $P_{av,cap}$ of one or more available energy sources;

Comparing available power capacity $P_{av,cap}$ of power feeding energy source or sources to the electricity consumption $E_{TOT}$ comprising scheduled transmission electricity consumption $E_{tr,TOT}$ during a coming scheduled transmission interval;

Selecting based on the comparison and one or more pre-defined conditions of the one or more available energy sources at least one available energy source, as power feeding energy source for accomplishing the total needed power of the transmission site or part of the transmission site for the coming time period;

Controlling the one or more available energy sources according to the selection and the one or more pre-defined conditions of the one or more available energy sources.

It is further herein provided a computer program 260. Said computer program comprises computer program code which, when run in a processor 252 of a processor circuitry 250 of an energy control device 200, causes the device 200 to perform the steps of the method S160.

A computer program product 258 is also provided. The computer program product comprises a computer program 260 and a computer readable means 254, 258 on which the computer program is stored. Said computer program comprises computer program code which, when run in the processor 252 of the processor circuitry 250 of an energy control device 200, causes the device 200 to perform the steps of the method S160.

According to further one aspect, a carrier containing a computer program 260, wherein the carrier is one of an electronic signal, optical signal, radio signal or computer readable storage medium. Said computer program comprises computer program code which, when run in a processor circuitry of a RBS device, causes the RBS to perform steps of the method S160.

The above presented method S160 of the method S100 and the energy control device has a number of advantages, such as:

1) Sustainable energy functionality for transmission sites, e.g. BTS/RBS/NodeB/eNodeB/NX NodeB (NR according 3GPP), and infrastructure based on traffic demand and controlled from the scheduler.
2) The proposed solution is an enabler for an end-to-end (E2E) solution for a 5G high efficiency energy source control system for RBS with multi energy sources and improves the Network energy performance and Quality of Service.
3) The alternative energy sources are utilized in an optimum way and perform in relation to the dynamic traffic situation. This improves the energy efficiency.
4) The method is scalable for a variety of RBS site solutions and can be applied on and addressed to current and future installed base.
5) The proposed solution is an enabler for a multi sustainable energy source intelligent control from the traffic scheduler. The method is truly load dependent and energy scalable arrangement.
6) By calculating the energy headroom in advance based on information from the traffic scheduler, the energy sources can start/be active in time before the radio traffic need is there. If the DG for some reason (or another energy source) does not start, the next energy source can be activated. This is especially important in critical applications during power failures to not lose any traffic or increase the downtime of the radio.
7) The energy sources that are not used are turned off. Stand by power or idle power is-wasted energy. The energy sources do not need to be in standby mode and thereby waste energy. By calculating the energy headroom in advance the energy sources are controlled and turned on when needed, because the power demand is known in advance from the traffic scheduler for next TTI(s). The current solution requires that the wind and solar power units are always ON to be able to deliver power first.
8) The proposed solution is an enabler for efficient site solution planning by keeping costs down and reducing optimizing the solution.
9) The proposed solution is an enabler for integration of 3PP, in to Operating and Support System (OSS) (most energy sources are third party products (3PP)).
10) Energy sources are integrated and visualized upstream on OSS.

KPI performance versus energy saving control is visible for the energy source.

A number of embodiments of the technique have been described. Said embodiments should be regarded as examples of the described technique and not limitations. It will be understood that various modifications may be made without departing from the described technology. Therefore, other implementations may be considered to be within the scope of the following claims.

The invention claimed is:

1. A method for estimating future electricity consumption during one or more future transmission intervals of a transmission site, said transmission site having an associated scheduler for scheduling assignments and at least one radio transmitter having a radio efficiency ($\eta_r$), said method comprising:

estimating scheduled transmission electricity consumption during a future transmission interval of the transmission site based on a quotient of a sum ($P_{sch,sum}$) of scheduled radio transmission powers ($P_{sch}$) and the radio efficiency ($\eta_r$);

determining an electricity consumption ($E_{PDI}$) of a power distribution system of the transmission site by calculating a difference between electricity supplied ($E_{tot,in}$) to the transmission site and the scheduled transmission electricity consumption ($E_{tr,TOT}$); and estimating the future electricity consumption ($E_{TOT}$) during the future transmission interval of the transmission site by adding the electricity consumption ($E_{PDI}$) of the power distribution system of the transmission site during the transmission interval to the scheduled transmission electricity consumption ($E_{tr,TOT}$).

2. The method according to claim 1, for determining a tenant's site electricity consumption share ($E_{site,ten}^{Tp}$) of the electricity consumption ($E_{TOT}^{Tp}$) of a number of tenants k (k=1, 2, 3, . . . , K) using the site or part of the site during a preset passed time period ($T_P$) comprising passed transmission intervals, the method comprises:

calculating the total electricity consumption ($E_{TOT}^{Tp}$) for the transmission site or part of the transmission site during the preset time period ($T_P$) by summing the total transmission electricity consumption ($E_{tr,TOT,site}^{Tp}$) and calculated power consumption ($E_{PDI}$) in the site power distribution system during the preset time period ($T_P$);

calculating the tenant's site electricity consumption ($E_{site,ten}^{Tp}$) as the tenant's relative share ($SH_{ten}^{k}$) of the transmission power consumption multiplied with the total power consumption ($E_{TOT}^{Tp}$) for the transmission site or part of the transmission site during the preset time period ($T_P$).

3. The method according to claim 1, wherein the scheduled power ($P_{sch}$) during transmission interval is acquired from an energy per Resource Element of the scheduler.

4. A method for estimating future electricity consumption during one or more future transmission intervals of a transmission site, said transmission site having an associated scheduler for scheduling assignments and at least one radio transmitter having a radio efficiency ($\eta_r$), said method comprising:

estimating scheduled transmission electricity consumption based on a quotient of a sum ($P_{sch,sum}$) of scheduled radio transmission powers ($P_{sch}$) and the radio efficiency ($\eta_r$); and controlling a set of energy sources supplying the transmission site with electric power, wherein the controlling comprises:

estimating of available power capacity ($P_{av,cap}$) of one or more available energy sources of the set of energy sources;

comparing available power capacity ($P_{av,cap}$) of the one or more available energy sources to the future electricity consumption ($E_{TOT}$) comprising scheduled transmission electricity consumption ($E_{tr,TOT}$) during a coming scheduled transmission interval;

selecting, based on the comparison and one or more pre-defined conditions of the one or more available energy sources, at least one available energy source of the one or more available energy sources as a power feeding energy source for accomplishing the total needed power of the transmission site or part of the total needed power of the transmission site for the coming scheduled transmission interval; and controlling the one or more available energy sources to accomplish one of the total needed power or part of the total needed power of the transmission site for the coming scheduled transmission interval according to the selection and the one or more pre-defined conditions of the one or more available energy sources.

5. The method according to claim 4, wherein one of said conditions for selecting the at least one available energy source of the one or more available energy sources is power line efficiency, the selecting step comprises:

determining power line efficiency for each of the available energy sources;

identifying the available energy source having the best power efficiency;

selecting one or more available energy sources having the best power line efficiency as a power feeding energy source.

6. The method according to claim 4, wherein one of said conditions for selecting the at least one available energy source of the one or more available energy sources is energy headroom, which is the difference between the maximum stated power capacity and the power delivered by the energy source for the moment, the selecting step comprises:

estimating energy headroom for each of the available energy sources;

identifying the available energy source having the best energy headroom;

selecting one or more available energy sources having the best energy headroom as a power feeding energy source.

7. The method according to claim 4, wherein the estimation of available power capacity ($P_{av,cap}$) of the one or more available energy sources is based on preset energy source conditions defining an operation mode of at least one of the available energy sources.

8. The method according to claim 4, wherein the estimation of available power capacity ($P_{av,cap}$) of the one or more available energy sources is based on malfunction detection of a feeding energy source and the activation of another available power.

9. An energy control device for estimating future electricity consumption during one or more future transmission intervals of a transmission site comprising a scheduler for scheduling assignments and a set of radio transmitters having known radio efficiency ($\eta_r$), the device comprising a processor in a processing circuitry being operative to perform:

estimating scheduled transmission electricity consumption during a future transmission interval of the transmission site based on a quotient of a sum ($P_{sch,sum}$) of scheduled radio transmission powers ($P_{sch}$) and the radio efficiency ($\eta_r$);

determining an electricity consumption ($E_{PDI}$) of a power distribution system of the transmission site by calculating a difference between electricity supplied ($E_{tot,in}$) to the transmission site and the scheduled transmission electricity consumption ($E_{tr,TOT}$); and estimating the future electricity consumption ($E_{TOT}$) during the future transmission interval of the transmission site by adding the electricity consumption ($E_{PDI}$) of the power distribution system of the transmission site during the transmission interval to the scheduled transmission electricity consumption ($E_{tr,TOT}$).

10. The energy control device according to claim 9, wherein the processor is further operative to determine a tenant's site electricity consumption ($E_{site,ten}^{Tp}$) of the electricity consumption ($E_{TOT}^{Tp}$) of a number of tenants k (k=1, 2, 3, . . . , K) using the transmission site during a preset passed time period ($T_P$) comprising passed transmission intervals (TI), comprising:

calculating the total electricity consumption ($E_{TOT}^{Tp}$) for the transmission site during the preset time period ($T_P$) by summing the total transmission electricity consumption ($E_{tr,TOT,site}^{Tp}$) and calculated power consumption ($E_{PDI}$) in the site power distribution system during the preset time period ($T_P$);

calculating the tenant's site electricity consumption ($E_{site,ten}^{Tp}$) as the tenant's relative share ($SH_{ten}^{k}$) of the transmission power consumption multiplied with the total power consumption ($E_{TOT}^{Tp}$) for the transmission site or part of the transmission site during the preset time period ($T_P$).

11. The energy control device according to claim 9, wherein the scheduled power ($P_{sch}$) during transmission interval is acquired from an energy per Resource Element of the scheduler.

12. An energy control device for estimating future electricity consumption during one or more future transmission intervals of a transmission site comprising a scheduler for scheduling assignments and a set of radio transmitters having known radio efficiency ($\eta_r$), the device comprising a processor in a processing circuitry being operative to perform:
  estimating scheduled transmission electricity consumption based on a quotient of a sum ($P_{sch,sum}$) of scheduled radio transmission powers ($P_{sch}$) and the radio efficiency ($\eta_r$); and
  controlling a set of energy sources supplying the transmission site with electric power, wherein the controlling comprises:
    estimating of available power capacity ($P_{av,cap}$) of one or more available energy sources of the set of energy sources;
    comparing available power capacity ($P_{av,cap}$) of the one or more available energy sources to the future electricity consumption comprising scheduled transmission electricity consumption ($E_{tr,TOT}$) during a coming scheduled transmission interval;
    selecting, based on the comparison and one or more pre-defined conditions of the one or more available energy sources, at least one available energy source of the one or more available energy sources as a power feeding energy source for accomplishing the total needed power of the transmission site or part of the total needed power of the transmission site for the coming scheduled transmission interval; and
    controlling the one or more available energy sources to accomplish one of the total needed power or part of the total needed power of the transmission site for the coming scheduled transmission interval according to the selection and the one or more pre-defined conditions of the one or more available energy sources.

13. The energy control device according to claim 12, wherein one of said conditions for selecting the at least one available energy source of the one or more energy sources is power line efficiency, the processor is further operative to:
  determining power line efficiency for each of the available energy sources;
  identifying the available energy source having the best power efficiency;
  selecting one or more available energy sources having the best power line efficiency as power feeding energy source.

14. The energy control device according to claim 12, wherein one of said conditions for selecting the at least one available energy source of the one or more energy sources is energy headroom, which is the difference between the maximum stated power capacity and the power delivered by the energy source for the moment, the processor is further operative to:
  estimating energy headroom for each of the available energy sources;
  identifying the available energy source having the best energy headroom;
  selecting one or more available energy sources having the best energy headroom as power feeding energy source.

15. The energy control device according to claim 12, wherein the processor is further operative to perform the estimation of available power capacity ($P_{av,cap}$) of one or more available energy sources is based on preset energy source conditions defining an operation mode of at least one of the available energy sources.

16. The energy control device according to claim 12, wherein the processor is further operative to perform the estimation of available power capacity ($P_{av,cap}$) of the one or more available energy sources is based on malfunction detection of a feeding energy source and the activation of another available power.

* * * * *